US012114126B2

(12) United States Patent
Lastrucci

(10) Patent No.: US 12,114,126 B2
(45) Date of Patent: Oct. 8, 2024

(54) MODULAR SPEAKER AND MODULAR SOUND REPRODUCTION SYSTEM

(71) Applicant: POWERSOFT S.P.A., Scandicci (IT)

(72) Inventor: Claudio Lastrucci, Lastra a Signa (IT)

(73) Assignee: POWERSOFT S.P.A., Scandicci (IT)

( * ) Notice: Subject to any disclaimer, the term of this patent is extended or adjusted under 35 U.S.C. 154(b) by 0 days.

(21) Appl. No.: 17/817,444

(22) Filed: Aug. 4, 2022

(65) Prior Publication Data

US 2023/0039063 A1 Feb. 9, 2023

(30) Foreign Application Priority Data

Aug. 5, 2021 (IT) ........................ 102021000021269

(51) Int. Cl.
*H04R 1/28* (2006.01)
*H04R 1/02* (2006.01)

(52) U.S. Cl.
CPC ........... *H04R 1/2811* (2013.01); *H04R 1/026* (2013.01); *H04R 2201/021* (2013.01); *H04R 2420/09* (2013.01)

(58) Field of Classification Search
CPC .................. H04R 1/2811; H04R 1/026; H04R 2201/021; H04R 2420/09
See application file for complete search history.

(56) References Cited

U.S. PATENT DOCUMENTS 5,402,502 A * 3/1995 Boothroyd ............. H04R 1/026 381/160
10,264,340 B1 4/2019 Hsu
2017/0223440 A1 8/2017 Rodrigues
2018/0077486 A1 3/2018 Li et al.
2018/0184183 A1 6/2018 Kaplan et al.
2018/0352313 A1 12/2018 Hsu

FOREIGN PATENT DOCUMENTS

KR 200900036245 * 4/2009 ............... H04R 1/02
WO 2016/033552 A1 3/2016
WO 2016/160020 A1 10/2016

OTHER PUBLICATIONS

Machine translation of KR20090036245A, Apr. 14, 2009, Kim, Speaker Apparatus.*
Italian Search Report dated Apr. 28, 2022 for corresponding Italian Application No. IT202100021269.

* cited by examiner

*Primary Examiner* — Andrew Sniezek
(74) *Attorney, Agent, or Firm* — Pearne & Gordon LLP; Bryan M. Gallo

(57) ABSTRACT

A modular speaker (100) includes a main module (200) defining a speaker (20) and including a cabinet (21) extending along a longitudinal axis (X) between a first and a second end (21*a,* 21*b*), a sound transducer (22), provided at the first end (21*a*) of the cabinet (21) and a connection circuit (23), provided at the second end (21*b*) of the cabinet (21). The modular speaker (100) also includes a rear module (300) selectable from a plurality of rear modules (300) and connectable reversibly to the second end (21*b*) of the cabinet (21) and a front module (400), defining an acoustic accessory selectable from a plurality of front modules (400) and connectable reversibly to the first end (21*a*) of the cabinet (21).

18 Claims, 14 Drawing Sheets

400
401

400
402

400
403

400
404

400
26
21
405

400
406

MODULAR SPEAKER AND MODULAR SOUND REPRODUCTION SYSTEM

CROSS-REFERENCE TO RELATED APPLICATIONS

This application claims the benefit of Italian Application No. 102021000021269, filed 2021 Aug. 5, the entire disclosure of which is hereby incorporated herein by reference.

FIELD OF THE INVENTION

This invention relates to a modular speaker and to a modular sound reproduction system.

BACKGROUND OF THE INVENTION

This invention addresses the field of sound reproduction systems, specifically speakers, where there is an ever growing need for a product that is versatile not only in terms of where the speaker can be positioned in a music listening room but also in terms of the quality of the sounds produced.

More specifically, prior art speakers comprise a shell or cabinet associated with a sound transducer and with a first and a second passive resonator provided with vibrating panels and facing the outside of the shell.

As is known, the shell also comprises a first end where an acoustic accessory, such as, for example, a subwoofer, is irreversibly mounted, and a second end where an element for supporting the speaker is irreversibly mounted.

Examples of known speakers are provided by the following patent documents: U.S. Ser. No. 10/264,340B1, US2018352313A1, US2018184183A1, WO2016033552A1 and WO2016160020A1.

Disadvantageously, in this situation, the speaker is "inflexible". If the speaker needs to be placed on the floor (or on a raised flat surface) but is one that has been manufactured with a hook-up element configured to allow it to hang, the hook-up element cannot be removed and replaced with a suitable supporting element. In the same way, if the speaker has been manufactured with a subwoofer mounted at the first end of it, the subwoofer cannot in any way be replaced with another accessory capable of modifying and/or enhancing the acoustic performance of the speaker.

BRIEF SUMMARY OF THE INVENTION

The technical purpose of this invention is, therefore, to provide a modular speaker and a modular sound reproduction system capable of overcoming the disadvantages of the prior art.

Accordingly, the aim of this invention is to provide a modular speaker that is versatile.

Another aim of this invention is to provide a modular sound reproduction system that is adaptable and capable of meeting any sound reproduction needs a user may have.

The technical purpose indicated and the aims specified are substantially achieved by a modular speaker and a modular sound reproduction system comprising the technical features described in one or more of the accompanying claims. The dependent claims correspond to possible embodiments of the invention.

More specifically, the technical purpose indicated and the aims specified are achieved by a modular speaker comprising a main module defining a speaker, a rear module and a front module which are respectively connectable to the main module.

The main module, defining the speaker, comprises a cabinet extending along a longitudinal axis between a first and a second end. The cabinet includes a side wall extending around the longitudinal axis to surround an internal volume. The side wall is provided with an opening to place the internal volume in communication with an outside environment.

According to an aspect of this disclosure, the cabinet is cylindrical or substantially cylindrical in shape.

According to a further aspect of this disclosure, the cabinet comprises a supporting frame whose function is to mechanically strengthen the speaker; the supporting frame extends along the longitudinal axis. The cabinet may also include a first half-shell and a second half-shell which are reversibly mountable (or connectable) to the supporting frame and which act in conjunction with the supporting frame to define respective portions of the side wall of the cabinet.

In other words, the side wall that delimits the internal volume is made partly by the supporting frame and partly by the half-shells attached to the supporting frame.

The supporting frame extends along the longitudinal axis and is substantially planar in shape (so as to make it easier to hook up the half-shells).

In a possible example, the supporting frame comprises a head end portion located in proximity to the first end of the cabinet. The supporting frame may also comprise a tail end portion and an annular portion.

The tail end portion, the annular portion and the head end portion are axially aligned along the longitudinal axis X. More specifically, the annular portion is interposed between the tail end portion and the head end portion.

In an embodiment, the annular portion and the head end portion act in conjunction with the half-shells to define the side wall of the cabinet. More specifically, the annular portion is provided with a succession of angularly distributed slots defining the opening of the cabinet.

Thus, the cabinet is provided with an opening whose function is to place the internal air volume (located in the interior of the cabinet) with the outside environment; this is important to reduce the overall size of the speaker. The opening includes at least a first and a second through hole, located on opposite sides of the side wall of the cabinet. Preferably, the opening is defined in the frame, for example, by the aforementioned slots.

According to an aspect of this disclosure, the main module also comprises a sound transducer, provided at the first end of the cabinet. In a possible embodiment, the sound transducer is housed in the head end portion of the supporting frame.

According to an aspect of this disclosure, the main module also comprises a first and a second passive resonator, each comprising a vibrating panel.

The vibrating panels are positioned in the internal volume, with respective first faces facing each other and respective second faces opposite the first faces. The vibrating panels of the first and a second passive resonator are configured to vibrate along a transversal axis, the transversal axis being perpendicular to the longitudinal axis. The vibrating panels of the first and a second passive resonator are oriented along respective reference planes, the reference planes of vibrating panels of the first and a second passive resonator being parallel to one another (and transversally spaced one with respect to the other) and parallel to the longitudinal axis.

Further, the vibrating panels are rigid and perform a translational movement towards and away from each other inside the internal volume.

In an embodiment, the first and the second passive resonator are circular or substantially circular in shape.

Alternatively, the first and the second passive resonator may have any shape, specifically an elliptic or oblong shape.

In an embodiment, the passive resonators are located entirely inside the internal volume and are mounted on opposite faces of the annular portion of the supporting frame.

In a possible embodiment, the first and the second passive resonator are placed inside the internal volume symmetrically about the longitudinal axis.

Further, the first and the second passive resonator lie in parallel planes. Advantageously, the fact that the first and second resonators lie in parallel planes and are symmetrical to each other about the longitudinal axis avoids imbalances and unwanted vibrations of the (modular) speaker during its operation.

The internal volume includes (or consist of) a first air volume and a second air volume. The first volume is delimited by an inside surface of the cabinet and by the second faces of the vibrating panels. The sound transducer is acoustically connected to the first air volume, so that the sound transducer determines a vibrating air pressure on the first and second passive resonators. The second air volume is delimited by the first faces of the vibrating panels and is open towards the outside environment through the opening.

Thus, the first and the second passive resonator delimit, in the internal volume, the first, closed or substantially closed air volume (also called volume of loading of the passive resonator) and the second air volume. The first volume is delimited by an inside surface of the cabinet and by the second faces of the vibrating panels, while the second air volume is delimited by the first faces of the vibrating panels and is open towards the outside environment through the opening.

In an example, the sound transducer and the vibrating panels of the passive resonators are connected to the supporting frame. The aperture (that puts in communication the second volume with the outside environment) may be defined by (or provided in) the supporting frame. In this example, the first and the second passive resonators are accommodated in the supporting frame. The sound transducer may connected to the supporting frame. The supporting frame may include a head end portion, located at the first end and defining a housing to accommodate the sound transducer; a tail end portion, located at the second end; and an annular portion surrounding the first and the second passive resonator to accommodate them. The annular portion is interposed between the head end portion and the tail end portion.

However, other mechanical arrangements are possible, provided that the internal volume surrounded by the side wall of the cabinet is divided into the first air volume and the second air volume, wherein the sound transducer and the second faces of the vibrating panels are acoustically connected through the first air volume and wherein the second air volume puts in communication the first faces of the vibrating panels with the outside environment through the opening. In a possible (non-illustrated) example, the first and second half-shells may support the sound transducer and the opening may be provided in the first and second half-shells.

The main module also comprises a connection circuit, provided at the second end of the body. The connection circuit is configured to receive a power supply and a signal and to transmit the signal to the sound transducer.

In an example, the connection circuit is connected to the sound transducer by cables extending in the annular portion of the supporting frame. Looking in more detail, these cables follow the profile of the annular portion and remain adherent thereto.

Preferably, the connection circuit comprises a plurality of concentric conductive tracks having a planar shape. Further, the conductive tracks are centred on the longitudinal axis.

In a possible embodiment, a pair of conductive tracks performs the function of positive terminal and negative terminal to define an electrical connection between the connection circuit and a power source. This pair of conductive tracks might also transmit the signal. Alternatively, the signal might be transmitted by another pair of conductive tracks of the plurality.

According to an aspect of this disclosure, the second end provided with the connection circuit and the first end provided with the transducer act as elements for closing the internal volume, which is thus delimited by the side wall, by the sound transducer and by the connection circuit.

According to an aspect of the present disclosure, the speaker is a modular speaker and may comprise, further to the main module, a rear module and/or a front module.

In this context, the main module of the speaker may comprise at least one of the following items:

- a first mechanical connector, configured to mechanically connect the first end of the cabinet reversibly to a front module defining an acoustic accessory adapted to modify and/or extend the sound features of the speaker;
- a second mechanical connector, configured to mechanically couple the second end of the cabinet reversibly to a rear module provided with a plurality of electrical connectors and configured to connect the cabinet to a wall.

Thus, in an example, the modular speaker also comprises a front module defining an acoustic accessory selectable from a plurality of front modules.

The front module is configured to convey sound waves towards an output of the modular speaker along a predetermined path.

The front module is also configured to modify and/or extend the sound features of the modular speaker.

The front module is selectable from one or more of the following accessories: A protective grid configured to prevent extraneous elements from entering the cabinet, a speech diffuser, a low frequency extension accessory, a sound deflector configured to spread sound in a direction different from a direction defined by the longitudinal axis and a 360° sound diffuser configured to spread a sound in all directions.

The front module can be connected reversibly to the first end of the cabinet.

More specifically, the modular speaker comprises the first mechanical connector configured to make a reversible mechanical connection between the first end of the cabinet and the front module. The first mechanical connector may include (be) for example one of the following: a threaded connector, a bayonet coupling, a pressure fitting, a shape coupling, screws and the like, that is to say, any connecting element capable of connecting the two modules reversibly to each other.

In an example, the modular speaker also comprises a rear module selectable from a plurality of rear modules and connectable reversibly to the second end of the cabinet.

The rear module comprises a plurality of electrical connectors operatively connectable to the connection circuit of the cabinet and to a power source to transmit a signal and an electric power supply to the connection circuit, respectively. In this situation, the rear module is connected to the main module in such a way as to transmit an electric power supply and a signal to the transducer of the main module.

The rear module is reversibly connected mechanically to the second end of the cabinet through the second connector. The second mechanical connector is for example one of the following: a threaded connector, a shape coupling, a bayonet coupling, a pressure fitting, screws and the like, that is to say, any connecting element capable of connecting the two modules reversibly to each other.

The rear module also comprises a hook-up connector, that is, hook-up means configured to mount the speaker on a wall and/or on a ceiling. The hook-up connector may comprise a plate (or even a hook) applicable to a wall and connecting terminals configured to connect the electrical connectors to an electrical power supply. The plate is thus configured to mount the modular speaker at a fixed (and spatially oriented) position.

Alternatively, the hook-up connector comprises a hanging element, for example, a string or a cable, extending away from the rear module and configured for hanging the modular speaker from a ceiling.

In an embodiment, the second end of the cabinet might comprise a hook to which the hanging element could be applied once the main module has been connected to the rear module.

In an embodiment, the hanging element comprises an outer sheath defining a housing for connecting terminals configured to connect the electrical connectors to an electrical power supply.

Alternatively, the hook-up connector comprises a supporting element, fixable to a wall to apply the modular speaker to the wall permanently, and a hook-up member operatively connected to the supporting element by a swivel fitting. The swivel fitting is configured to allow the hook-up member, hence the main module applicable to it, to be oriented so that the sound can be "directed" as desired in the room where the modular speaker is placed. In this embodiment, too, the hook-up connector also comprises connecting terminals extending between the supporting element and the hook-up member and configured to connect the electrical connectors to an electrical power supply.

Alternatively to the hook-up connector, the rear module may comprise a further connection circuit configured to receive the signal and to transmit the signal to the connection circuit of the cabinet. In such a rear module, the electrical connectors are located on a first wall, while the further connection circuit is located on a second wall, opposite the first wall. This rear module acts as intermediate module and also comprises a mechanical connecting means located on the second wall and configured to reversibly mount the rear module (that is, the intermediate module) to a first wall of a further rear module. In this situation, two or more rear modules can be connected in series so as to extend the range of features of the modular speaker. For example, it is possible to connect rear modules with Bluetooth feature (to exchange data between the speaker and a remote device) to rear modules with hook-up connectors so as to obtain a modular speaker that is versatile not only in terms of its features but also in terms of where it can be positioned.

The modular speaker thus allows a rear module and a front module, selected from a plurality of modules, to be applied and removed to and from the main module, thereby enhancing its versatility.

In an embodiment of the modular speaker, the rear module might have a front end that is operatively connected to the main module and the front module might have a rear end that is operatively connected to the main module.

Furthermore, the main module, the front end of the rear module and the rear end of the front module might be substantially cylindrical in shape and aligned along the longitudinal axis. This gives the modular speaker as a whole a substantially cylindrical shape.

Thus, the present disclosure provides a modular speaker, comprising:

- a main module, defining a speaker according to one or more of the features provided in the present disclosure;
- a rear module, selectable from a plurality of rear modules and connectable reversibly to the second end of the cabinet, the rear module comprising a plurality of electrical connectors operatively connectable to the connection circuit of the cabinet and to a power source to transmit a signal and an electric power supply to the connection circuit, respectively;
- a front module, defining an acoustic accessory selectable from a plurality of front modules, the front module being connectable reversibly to the first end of the cabinet and being configured to modify and/or extend the sound features of the modular speaker.

Also an object of this disclosure is a modular sound reproduction system comprising a modular speaker according to one or more of the aspects described above.

The system also comprises a plurality of rear modules that are connectable reversibly to the second end of the cabinet. Each rear module comprises a plurality of electrical connectors operatively connectable to the connection circuit of the cabinet and to a power source to transmit a signal and an electric power supply to the connection circuit, respectively.

Each rear module may also be provided with hook-up connectors configured to allow the main module to be mounted on a ceiling and/or a wall.

In an embodiment, the hook-up connectors each comprise a plate that is applicable on a wall so that the main module can be mounted (and oriented) at a fixed, stable position. Alternatively, the hook-up connectors may comprise a hanging element extending away from the rear module so that the main module can be hung from a ceiling. Alternatively, the hook-up connectors may comprise a supporting element, fixable to a wall, and a hook-up member operatively connected to the supporting element by a swivel fitting. The swivel fitting allows the hook-up member, which the main module is mounted to, to be oriented in such a way that the main module can be directed as desired.

According to an aspect of the disclosure, the rear modules are connectable to the main module interchangeably. The rear modules might also be combined with each other in series.

In an embodiment, in order to apply two or more main modules simultaneously to a ceiling and/or to a wall, the system might comprise a supporting structure provided with a plurality of housings to which the rear modules can be mounted.

Alternatively, the housings can be provided with electrical connectors so that the main modules can be plugged directly into the housings without having to interpose the rear modules. In this situation, the main modules occupy a fixed position and cannot be oriented in a desired direction or hung, as is the case, instead, when the rear modules with the hook-up connectors are provided.

The system also comprises a plurality of front modules that are connectable reversibly to the first end of the main cabinet. Each front module defines an acoustic accessory and is configured to convey sound waves towards an output of the modular speaker along a predetermined path.

The plurality of front modules may comprise one or more of the following: a protective grid configured to prevent extraneous elements from entering the cabinet, a speech diffuser, a low frequency extension accessory, a sound deflector configured to spread sound in a direction different from a direction defined by the longitudinal axis X and a 360° sound diffuser configured to spread a sound in all directions.

The front modules are connectable to the main module interchangeably.

Also an object of this disclosure is a speaker. Generally speaking, the speaker may be separate from and independent of the modular speaker described above. Alternatively, in a possible embodiment, the speaker may be used as the main module of the modular speaker described above.

The speaker comprises a cabinet extending along a longitudinal axis between a first and a second end. The cabinet includes a side wall extending around the longitudinal axis to surround an internal volume and is provided with an opening to place the internal volume in communication with an outside environment.

In an embodiment, the side wall of the cabinet is cylindrical or substantially cylindrical in shape.

According to an aspect of the disclosure, the cabinet comprises a supporting frame and a first and a second half-shell which are reversibly mountable to the supporting frame and which act in conjunction with the supporting frame to define respective portions of a side wall of the cabinet.

Preferably, the first and the second half-shell are made of plastic material.

The speaker also comprises a sound transducer, provided at the first end of the cabinet, and a connection circuit, provided at the second end of the cabinet. The connection circuit is configured to receive a signal and to transmit the signal to the sound transducer.

In an embodiment, the connection circuit comprises a plurality of concentric conductive tracks having a planar shape.

In an embodiment, the speaker also comprises a plurality of electrical connectors operatively connectable to the connection circuit of the cabinet and to a power source to transmit a signal and an electric power supply to the connection circuit, respectively.

According to an aspect of this disclosure, the plurality of conductive tracks comprises a pair of power supply tracks performing the function of positive terminal and negative terminal, respectively, to make an electrical connection between the connection circuit and the electrical connectors.

According to a further aspect of this invention, the speaker comprises at least one light source, preferably a LED light source.

The light source is electrically connected to the connection circuit to receive an electric power supply signal. In this situation, the plurality of conductive tracks comprises at least one pair of lighting tracks, configured to transmit an electric power supply signal to the light source.

According to an aspect of this disclosure, the light source is located in the sound transducer so it is visible to an observer looking at the first end of the cabinet from the outside.

According to a further aspect of this disclosure, the speaker comprises at least one light guide configured to convey the light emitted by the light source to the sound transducer so it is visible to an observer.

In an embodiment, there are a plurality of light sources, each operatively connected to a respective pair of conductive tracks. The plurality of sources comprises light sources of different colours divided into groups, each containing one light source for each colour. These groups are angularly distributed around the first end of the cabinet so that when one light source of the same colour in each group is activated, an observer looking at the first end of the cabinet from the outside sees a ring of light of that colour. In this situation, the light sources act as a diagnostic feature of the speaker in that each colour can be associated with an operating state of the speaker.

The speaker also comprises a first and a second passive resonator, each comprising a vibrating panel.

The vibrating panels are positioned in the internal volume, with respective first faces facing each other and respective second faces opposite the first faces.

The vibrating panels are substantially rigid and move in translation towards and away from each other during the operation of the speaker. The vibrating panels act in conjunction to define a first and a second air volume inside the internal volume.

The first air volume is a closed (or substantially closed) volume delimited by an inside surface of the cabinet and by the second faces of the vibrating panels. The second air volume is delimited by the first faces of the vibrating panels and is open towards the outside environment through the opening.

In a possible embodiment, the first and the second passive resonator are positioned inside the internal volume symmetrically about the longitudinal axis.

Further, the first and the second passive resonator lie in parallel planes. This aspect, together with the symmetrical positioning, is advantageous in that it prevents unwanted vibrations of the speaker as a whole when the passive resonators are moved.

According to an aspect of this disclosure, the first and the second passive resonator are substantially oblong or elliptical in shape.

Alternatively, the first and the second passive resonator may be circular or substantially circular in shape.

Generally speaking, the length of the passive resonators is equal to the longitudinal distance between the sound transducer and the connection circuit so as to make the most of the internal volume.

The first and the second passive resonator are applied to the supporting frame. More specifically, the supporting frame comprises an annular portion, on opposite faces of which the first and the second passive resonator are applied. The annular portion, together with the first faces of the first and second passive resonators, delimits the second air volume.

On a lateral surface of it extending between the first and the second sound resonator, the annular portion comprises a succession of slots, angularly distributed and defining the opening in the cabinet through which the second air volume is open towards the outside environment.

According to an aspect of the disclosure, the annular portion has a diameter (or generally speaking, a longitudinal dimension) that is substantially equal to an axial distance between the sound transducer and the connection circuit. This axial distance is measured along the longitudinal axis.

According to a further aspect of the disclosure, the annular portion is included between a head end portion, defining the housing for the sound transducer, and a tail end portion of the supporting frame. The annular portion is interposed between the head end portion and the tail end portion and is axially aligned with the head end portion and the tail end portion along the longitudinal axis.

More in detail, the head end portion is positioned in proximity to the first end and defines a housing for the sound transducer, while the tail end portion is positioned in proximity to the second end and is provided with a hook-up element such as a ring, a hook or the like, of the speaker.

The hook-up element allows the speaker to be mounted/hung, for example, on a wall.

According to an aspect of this disclosure, the speaker also comprises a first mechanical connector, for example, a threaded connector, a shape coupling or a bayonet coupling, configured to mechanically connect the first end of the cabinet reversibly to a front module defining an acoustic accessory adapted to convey sound waves towards an output of the speaker along a predetermined path.

Alternatively or in addition to the first mechanical connector, the speaker comprises a second mechanical connector configured to mechanically connect the second end of the cabinet reversibly to a rear module configured to connect the cabinet to a wall, for example, by hook-up connectors placed thereon.

The rear module may also comprise a plurality of electrical connectors. In this situation, the electrical connectors and the hook-up element described above are not integrated in the second end of the speaker but are applied thereto by connecting the rear module to the cabinet. According to an aspect of this disclosure, the speaker also comprises an RFID radio frequency identification and communication device, located at the second end of the cabinet and including a memory that is readable and writable by an electronic device outside of the speaker. The speaker also comprises a control unit that includes a processor and a memory and that is connected to the RFID radio frequency identification and communication device and to the connection circuit. According to an aspect of this disclosure, the readable and writable memory is configured to record data representing front modules of different kinds, that is to say, representing different accessories. The readable and writable memory is also configured to record a unique speaker identification number. The moment a certain front module is applied to the first end of the cabinet, the control unit receives from the writable memory through the RFID radio frequency identification and communication device the unique speaker identification number and the data representing the accessory just mounted. In this situation, the control unit is able to adjust and set the operation of the connection circuit in such a way as to control the sound transducer, hence the sound feature of the speaker as a whole, based on that accessory. In a possible embodiment, the control unit is mounted on the speaker, thus making it a stand-alone speaker.

Alternatively, in the case of a series of speakers, for example, mounted on a single panel, each speaker is provided with its own RFID radio frequency identification and communication device, whilst there is a single control unit common to all of the speakers. In this situation, the control unit receives from each RFID radio frequency identification and communication device, information regarding the unique identification number of each speaker and regarding the accessory mounted thereon, so that the sound features for each can be suitably adjusted. Further features and advantages of the invention are more apparent in the exemplary, hence non-limiting description below.

BRIEF DESCRIPTION OF THE DRAWINGS

The description is set out below with reference to the accompanying drawings which are provided solely for purposes of illustration without limiting the scope of the invention and in which.

DESCRIPTION OF EXAMPLE EMBODIMENTS

Figure 1:
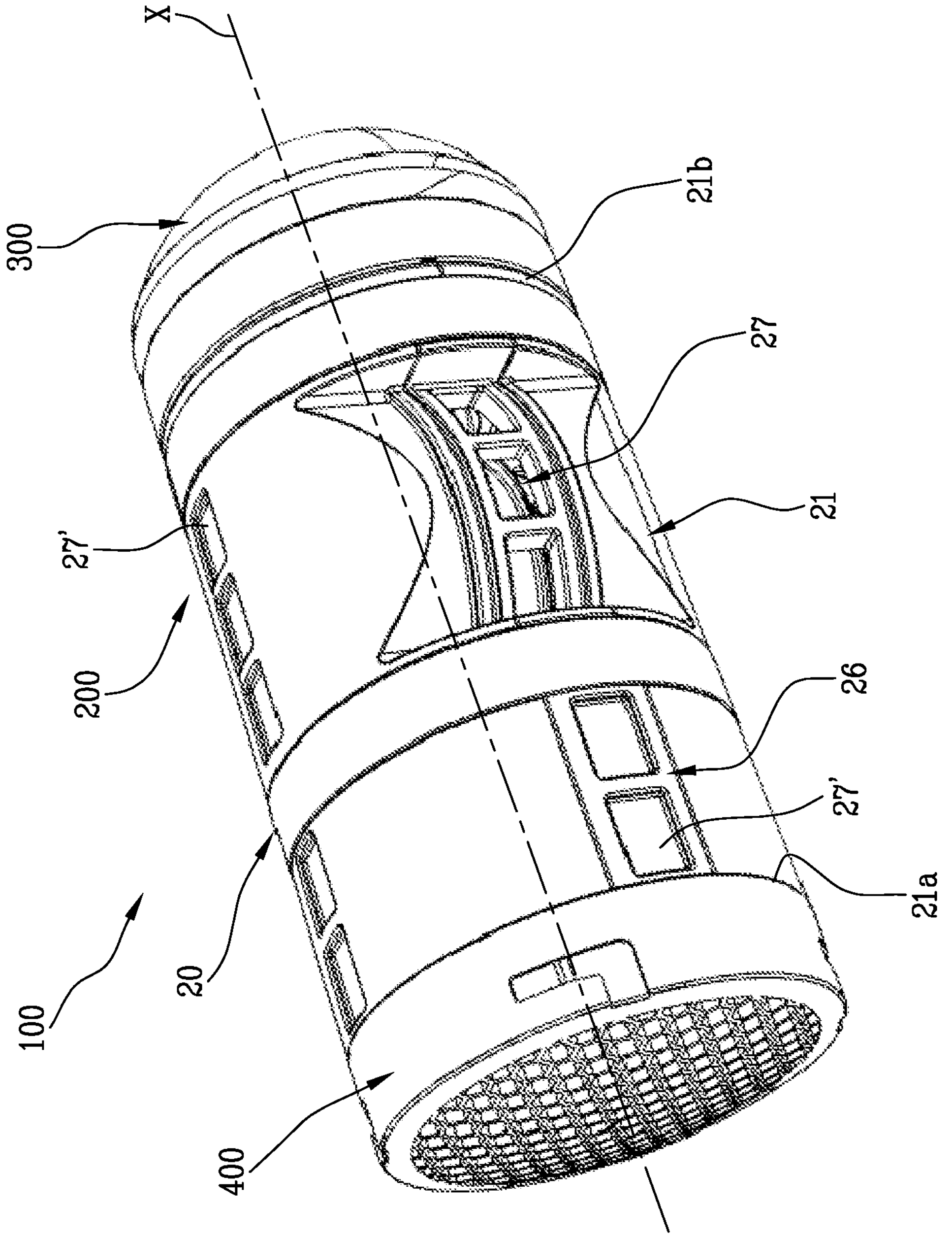
FIG. 1 is a perspective view of a modular speaker.

With reference to the accompanying drawings, the numeral 100 denotes a modular speaker.

The modular speaker 100 comprises a main module 200 defining a speaker 20 and comprising a cabinet 21 extending along a longitudinal axis X between a first and a second end 21*a*, 21*b*. The cabinet 21 includes a side wall extending around the longitudinal axis X to surround an internal volume and is provided with an opening to place the internal volume in communication with an outside environment.

In an example, the side wall of the cabinet 21 is cylindrical or substantially cylindrical in shape.

In the example shown in the accompanying drawings, the side wall is defined by two half-shells that are connectable to each other.

Preferably, the half-shells are made of plastic material.

The main module 200 also comprises a sound transducer 22, provided at the first end 21*a* of the cabinet 21.

In an example, the sound transducer 22 comprises a vibrating membrane. Alternatively, the sound transducer 22 might include a piezoelectric material or other systems of essentially known type in the field of sound reproduction systems.

The sound transducer 22 also includes an electric motor configured to set the membrane vibrating.

The main module 200 also comprises a connection circuit 23, provided at the second end 21*b* of the cabinet 21 and configured to receive a signal and to transmit the signal to the sound transducer 22. In an example, the connection circuit 23 comprises a plurality of concentric conductive tracks 23' having a planar shape. Further, the conductive tracks 23' are centred on the longitudinal axis X.

In a possible example, the plurality of conductive tracks 23' comprises a pair of power supply tracks performing the function of positive terminal and negative terminal, respectively, to make an electrical connection between the connection circuit 23 and a power source. In a possible embodiment, the pair of power supply tracks also carries the signal to the sound transducer 22. Alternatively, the signal is carried to the sound transducer 22 by another pair of conductive tracks 23' of the plurality.

The conductive tracks 23' may also transmit an electric power supply signal to a light source located in the sound transducer 22 so it is visible to an observer looking at the first end 21*a* of the cabinet 21 from the outside. To make the light emitted by the light source clearly visible from the outside, the main module comprises a light guide extending from the light source to the transducer 22.

In a possible example, two or more light sources of different colours are provided. These light sources are angularly disposed in proximity to the second end 21*b* of the cabinet 21 and are divided into groups, each having one light source for each colour available.

These light sources act as diagnostic tools which can indicate the operating state of the modular speaker 100 based on the colour. More in detail, depending on the operating state of the modular speaker 100, the light source of a certain colour in each group is activated so as to create a diffuse light that the observer can see.

Figure 6:
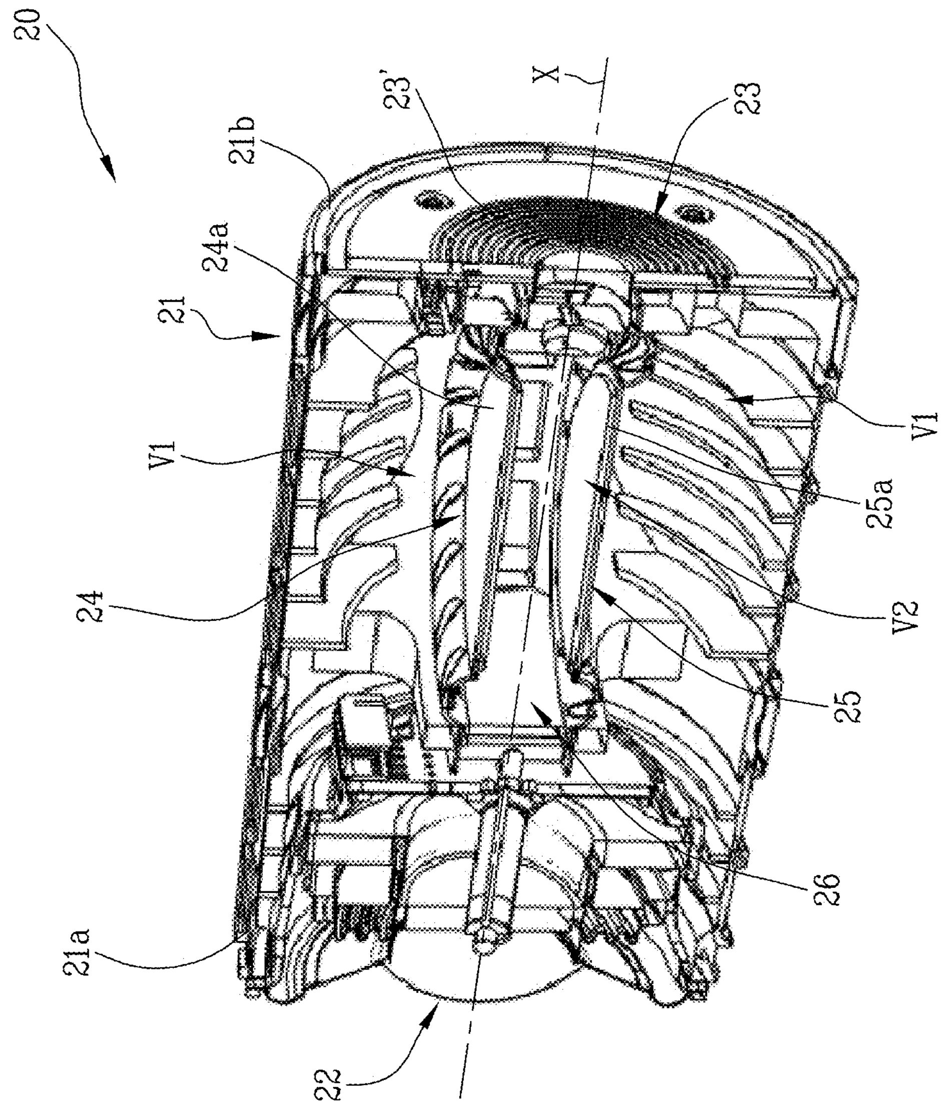
FIG. 6 shows a cross-sectional view of the speaker of FIGS. 5A and 5B.

According to an aspect of this disclosure, the main module 200 also comprises a first and a second passive resonator 24, 25, each comprising a vibrating panel 24*a*, 25*a* (FIG. 6).

The vibrating panels 24*a*, 25*a* are positioned in the internal volume, with respective first faces facing each other and respective second faces opposite the first faces.

The internal volume includes a first air volume V1 and a second air volume V2. The first volume is delimited by an inside surface of the cabinet and by the second faces of the vibrating panels. The first air volume V1 is a closed air volume or a substantially closed air volume. The sound transducer 22 is acoustically connected to the first air volume V1; hence, the sound transducer 22 determines a vibrating air pressure on the (vibrating panels 24*a*, 25*a* of the) first and second passive resonator 24, 25 (in other words, the first volume V1 provides a loading volume for the passive resonators). The second air volume V2 is delimited by the first faces of the vibrating panels 24*a*, 25*a* and is open towards the outside environment through the opening. As shown in FIG. 6, in an example, the second faces of the vibrating panels 24*a*, 25*a* and an inside surface of the cabinet 21 (specifically, the inside surface of the side wall of the cabinet 21) delimit the first, closed (or substantially closed) air volume V1 inside the internal volume. The first volume V1 is also called volume of loading of the passive resonator.

On the other hand, the first faces of the vibrating panels 24*a*, 25*a* delimit, inside the internal volume, the second air volume V2 that is open towards the outside environment through the opening.

In an example, the sound transducer 22 is acoustically connected to the first air volume V1 only, whilst the second ait volume V2 is open to the outside environment.

In the example shown in the accompanying drawings, the opening is defined by a series of slots 27 through which the air can pass when the vibrating panels 24*a*, 25*a* of the passive resonators 24, 25 are moved. Alternatively, the opening is a through hole in the side wall. In use, the passive resonators 24, 25 are set in motion by a change in the air pressure of the internal volume so as to produce the sound.

More specifically, the vibrating panels 24*a*, 25*a* of the passive resonators 24, 25 are displaced between a position where they are spaced apart and a position where they are close together. At the position where they are spaced apart, the vibrating panels 24*a*, 25*a* are moved in such a way that the second faces are brought near the lateral inside surface of the cabinet 21. In this situation, the second air volume V2 is larger than when it is delimited by the vibrating panels 24*a*, 25*a* at rest. At the position where they are close together, on the other hand, the vibrating panels 24*a*, 25*a* are moved in such a way that the first faces are brought closer together. In this situation, the second air volume V2 is smaller than when it is delimited by the vibrating panels 24*a*, 25*a* at rest and the air contained therein is pushed outside the cabinet 21 through the opening.

Figure 7:
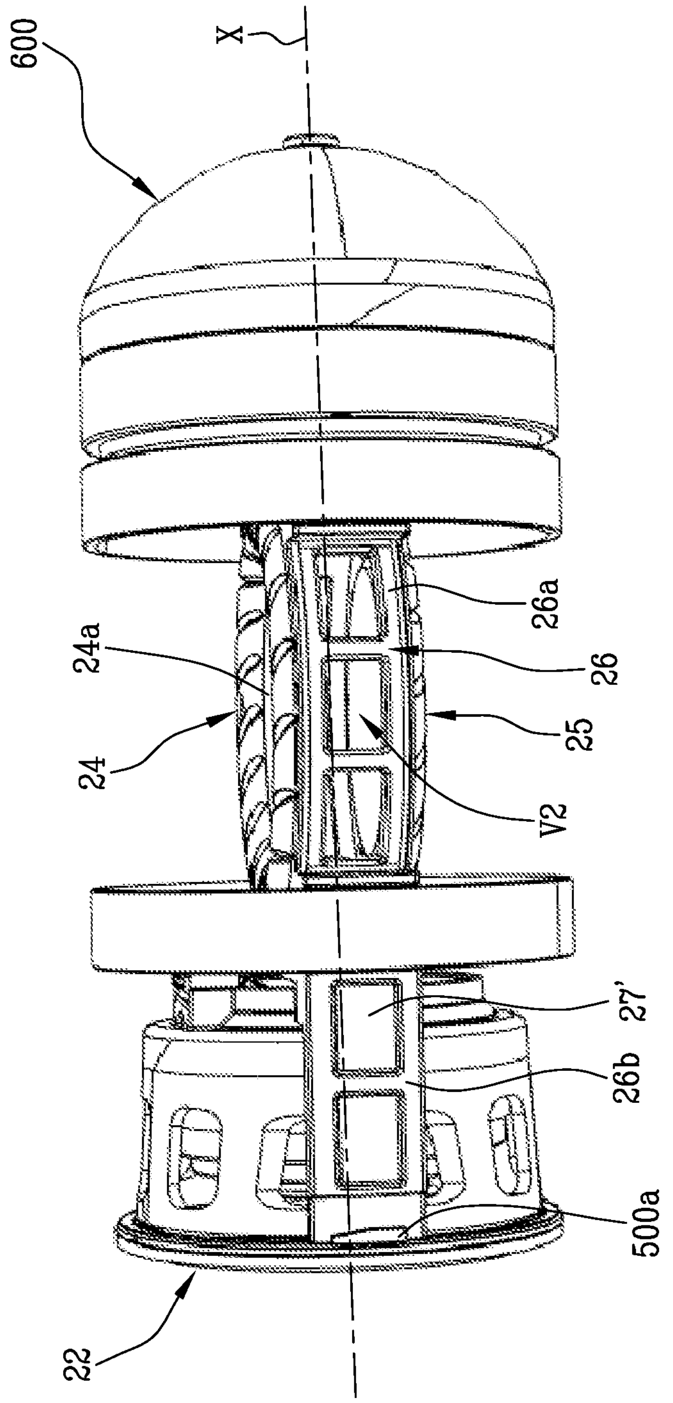
FIG. 7 shows a side view of the speaker of FIGS. 5A and 5B from which a part of a side wall has been removed.

In a possible embodiment, the first and the second passive resonator 24, 25 are positioned inside the internal volume symmetrically about the longitudinal axis X (FIGS. 6 and 7).

Further, the first and the second passive resonator 24. 25 lie in parallel planes.

In a possible embodiment, the first and the second passive resonator 24, 25 are circular or substantially circular in shape. Alternatively, the first and the second passive resonator 24, 25 are substantially oblong or elliptical in shape.

Figure 8:
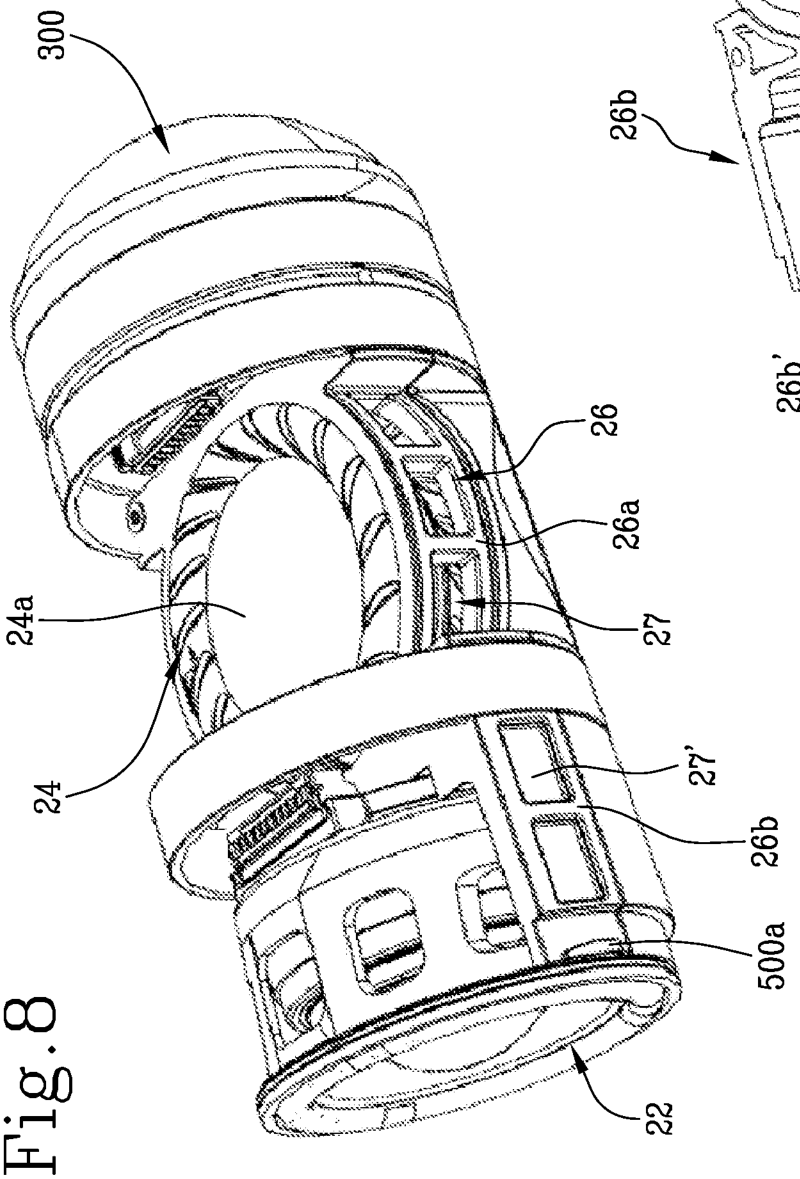
FIG. 8 shows a perspective view of FIG. 7.

Generally speaking, the length of the passive resonators 24, 25 is equal to the longitudinal distance between the sound transducer 22 and the connection circuit 23 so as to make the most of the internal volume (FIG. 8).

In a possible embodiment, the main module 200 also comprises a supporting frame 26 on which the first and second passive resonators 24, 25 are mounted.

More specifically, the supporting frame 26 comprises an annular portion 26*a* on respective opposite faces of which the passive resonators 24, 25 are mounted.

The annular portion 26*a* also has a lateral surface extending between the first and the second passive resonator 24, 25 and provided with a plurality of slots 27 defining the opening of the side wall of the cabinet 21.

Figure 9:
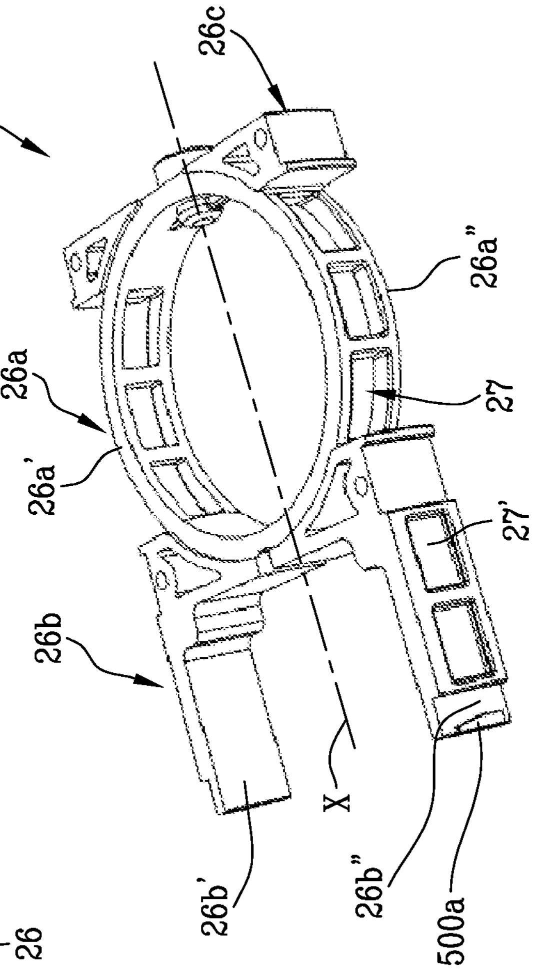
FIG. 9 shows a supporting frame of the speaker of FIGS. 5A and 5B.

The supporting frame 26 also comprises a head end portion 26*b*, in which the sound transducer 22 is housed, and a tail end portion 26*c*. The head end portion 26*b* and the annular portion 26*a* act in conjunction with the half-shells of the cabinet 21 to define the side wall. The portions 26*a*, 26*b*, 26*c* of the supporting frame 26 are aligned with each other along the longitudinal axis X and the annular portion 26*a* is interposed between the head end portion 26*b* and the tail end portion 26*c* (FIG. 9). In this situation, the sound transducer 22 and the connection circuit 23 are axially spaced apart along the longitudinal axis X by a distance equal to the diameter of the annular portion 26*a* of the supporting frame 26.

According to an aspect of this disclosure, the modular speaker 100 also comprises a front module 400 defining an acoustic accessory selectable from a plurality of front modules 400. The front module 400 is configured to convey sound waves towards an output of the modular speaker 100 along a predetermined path.

The front module 400 can be connected reversibly to the first end 21*a* of the cabinet 21.

More specifically, the front module 400 can be mechanically connected reversibly to the first end 21*a* of the cabinet 21 by means of a first mechanical connector 500*a*. The first mechanical connector 500*a* is thus configured to establish a reversible mechanical connection between the first end 21*a* of the cabinet 21 and the front module 400.

The first mechanical connector 500*a* may be, for example: a bayonet coupling, a shape coupling, a threaded connector or any kind of connector capable of making a reversible connection between the main module 200 and the front module 400.

Once the main module 200 has been applied, the front module 400 can modify and/or extend the sound features of the modular speaker 100.

Figure 13:
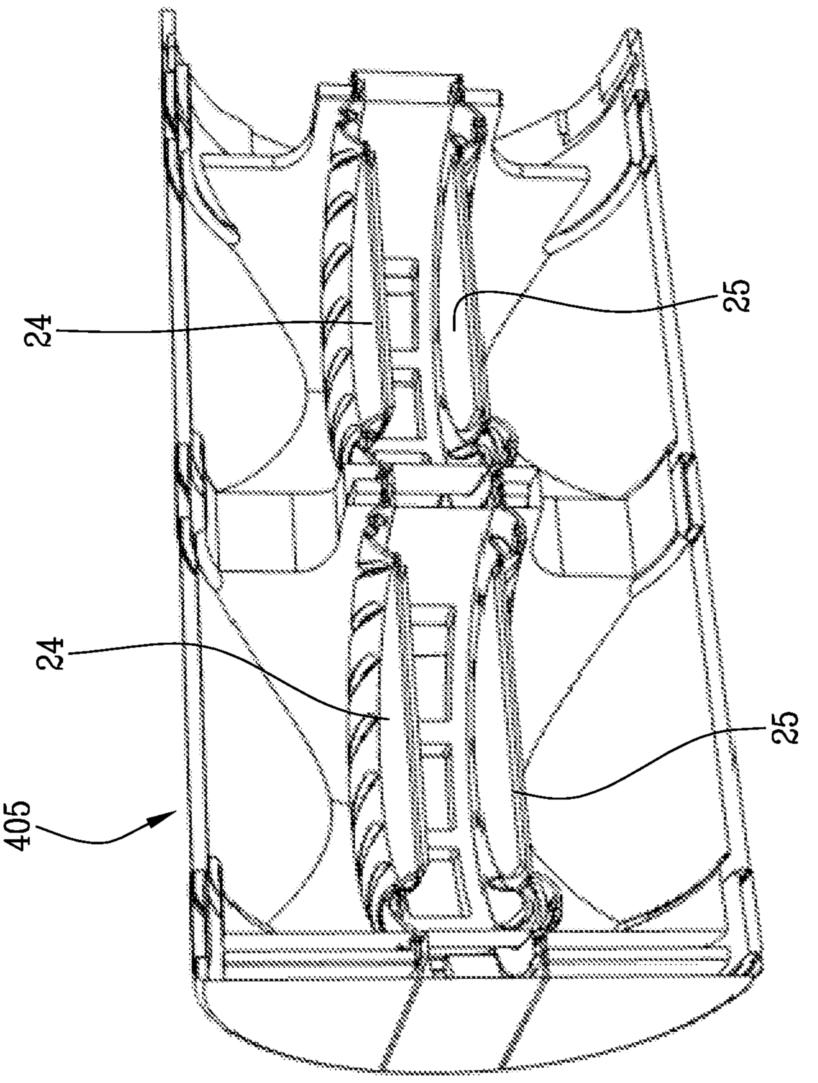
FIG. 13 shows a cross-sectional view of a front module of the modular system.

As shown in FIGS. 4A-4F, the front module 400 is selectable from one or more of the following accessories:

- a protective grid 401 configured to prevent extraneous matter, such as dust, for example, from entering the cabinet 21;
- a speech diffuser 403, 404 selectable from different diffusers having different SPL values;
- a sound deflector 406 configured to spread the sound in a direction different from a direction along which the main module 200 is oriented;
- a 360° sound diffuser 402 configured to spread the sound from the sound transducer 22 of the main module 200 in all directions;
- a low frequency extension accessory 405 provided with two pairs of passive resonators 24, 25 placed in series. As shown in FIG. 13, this accessory substantially replicates the structure of the main module 200 twice. The low frequency extension accessory 405 also has a first end that is closed and a second end that is connectable to the first end 21*a* of the cabinet of the main module 200.

In other words, a different front module 400 can be mounted on the main module 200 depending on the acoustic feature to be obtained from the modular speaker 100.

Figure 2:
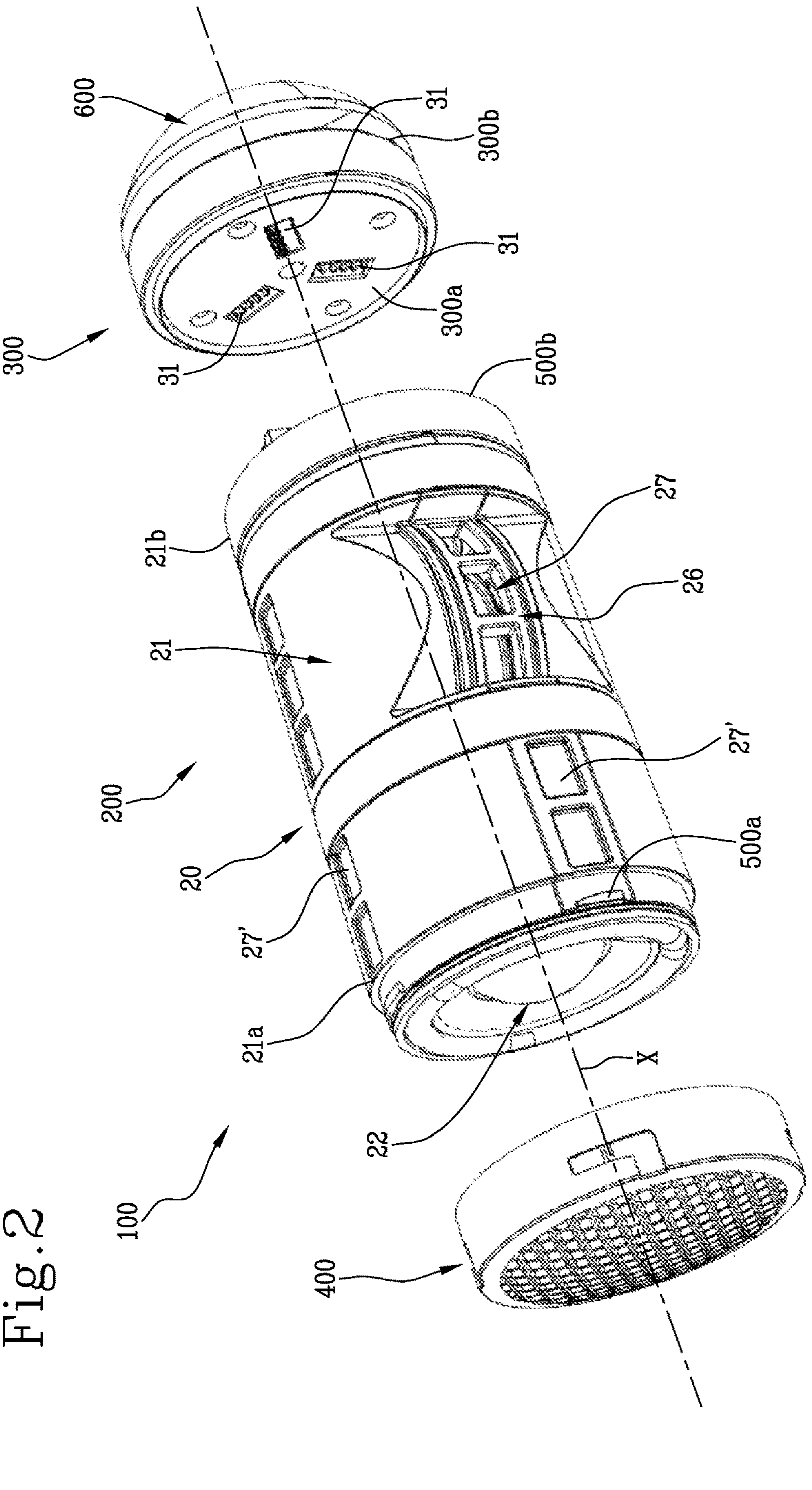
FIG. 2 is an exploded view of the modular speaker of FIG. 1.

In use, therefore, the front module 400 is reversibly mounted to the first end 21*a* of the cabinet 21 by means of a first mechanical connector 500*a* (FIG. 2).

The modular speaker 100 also comprises a rear module 300 selectable from a plurality of rear modules 300 and connectable reversibly to the second end 21*b* of the cabinet 21 of the main module.

More specifically, the rear module 300 can be mechanically connected reversibly to the second end 21*b* of the cabinet 21 by means of a second mechanical connector 500*b* (FIG. 2). The second mechanical connector 500*b* is thus configured to establish a mechanical connection between the second end 21*b* of the cabinet 21 and the rear module 300.

The second mechanical connector 500*b* can be chosen, by way of non-limiting example, from: a shape coupling, a threaded connector or a bayonet coupling.

According to an aspect of this disclosure, the rear module 300 comprises a plurality of electrical connectors 31 operatively connectable to the connection circuit 23 of the cabinet 21 and to a power source to transmit a signal and an electric power supply to the connection circuit 23, respectively (FIG. 2).

In other words, the rear module 300 is provided with built-in electrical connectors 31 so that by connecting the rear module 300 to the second end 21*b* of the cabinet 21, the electrical connectors 31 can slide on (or interact with) the conductive tracks 23' of the connection circuit 23 of the cabinet 21 of the main module 200, so as to transmit the signal and the electrical power supply to the sound transducer 22.

In a possible embodiment, the electrical connectors 31 are of a deformable type.

As shown in the accompanying drawings, the electrical connectors 31 are angularly distributed on the rear module 300. In this situation, a hook-up element such as a screw, for example, can be placed at the centre of the rear module 300 to define a further fastening point between the second end 21*b* of the cabinet 21 of the main module 200 and the rear module 300.

Figure 3A:
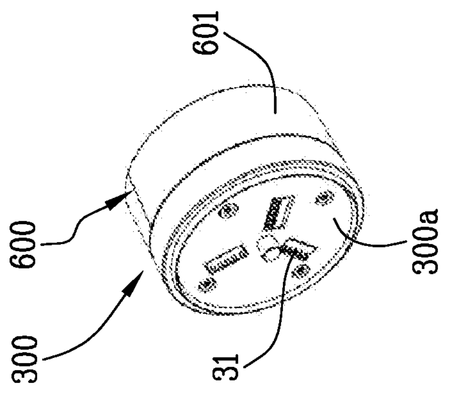
FIGS. 3A-3C are perspective views of different embodiments of a rear module of the modular speaker of FIG. 1.
Figure 3B:
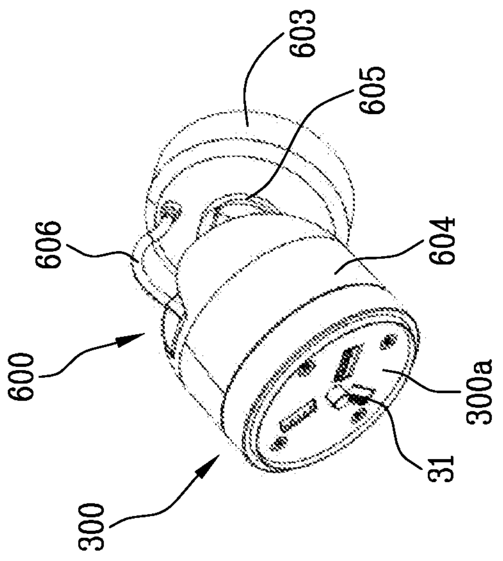
Figure 3C:
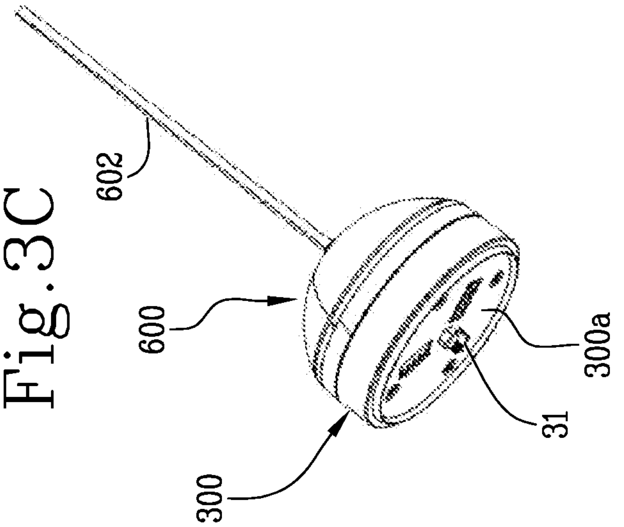
Figures 4A, 4B, 4C, 4D, 4E, 4F:
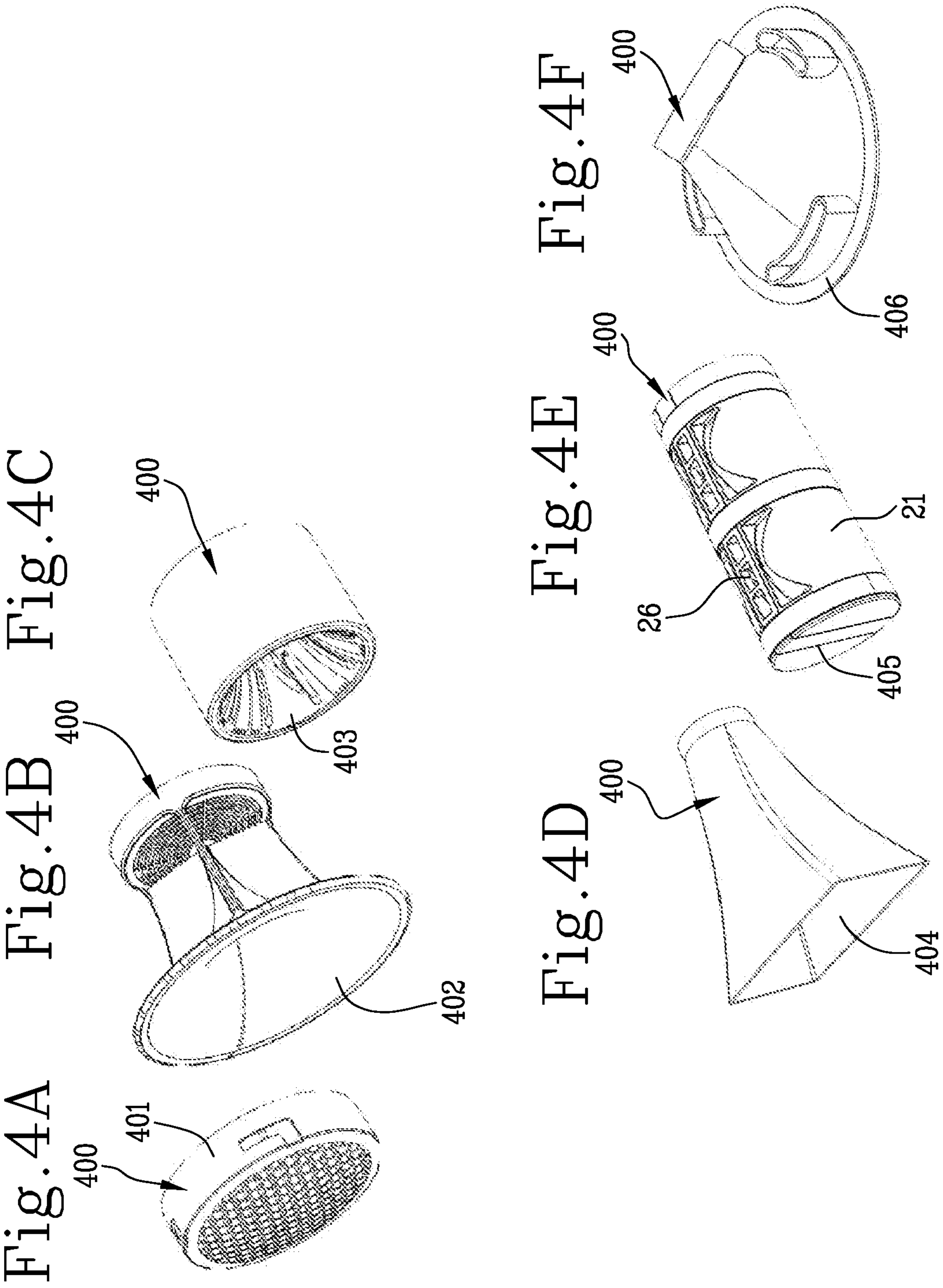
FIGS. 4A-4F are perspective views of different embodiments of a front module of the modular speaker of FIG. 1.

According to an aspect of this disclosure, the rear module 300 also comprises a hook-up connector 600 (constituting hook-up means) configured to allow mounting the modular speaker 100 on a wall (FIGS. 3A-3C).

In other words, the rear module 300 not only allows the transducer 22 to be electrically powered through the electrical connectors 31 in contact with the conductive tracks 23' but also to fix/hang the whole of the modular speaker 100 to a wall thanks to the hook-up connector 600.

In the embodiments illustrated in the accompanying drawings, the rear module 300 is provided, on a first wall 300*a* of it, with the electrical connectors 31 and, on a second wall 300*b* of it, opposite the first wall 300*a*, with the hook-up connectors 600.

With reference to FIG. 3A, the hook-up connectors 600 comprise a plate 601 which are applicable to a wall, for example, using screws or hooks. In this situation, the modular speaker 100 can be mounted (and oriented) at a fixed, stable position on a wall. The hook-up connectors 600 also comprise connecting terminals that are configured to connect the electrical connectors 31 of the rear module 300 to an electrical power supply.

In the embodiment of FIG. 3A, the plate 601 defines a containing space suitable for containing the connecting terminals and hiding them from view.

Alternatively, as shown in FIG. 3C, the hook-up connectors 600 comprise a hanging element 602, for example, a string or a cable, extending away from the rear module 300 and configured for hanging the modular speaker 100 from a ceiling. In this situation, it is thus possible to hang the modular speaker 100 and to adjust its distance from a ceiling by adjusting the length of the hanging element 602. The hanging element 602 comprises an outer sheath defining a housing for connecting terminals configured to connect the electrical connectors 31 to an electrical power supply.

With reference to FIG. 3B, the hook-up connectors 600 comprise a supporting element 603, fixable to a wall to apply the modular speaker 100 to the wall permanently, and a hook-up member 604 operatively connected to the supporting element 603 by a swivel fitting 605. The swivel fitting 605 is configured to allow adjusting the orientation of the hook-up member 604.

As shown in FIG. 3B, the electrical connectors 31 are located on the hook-up member 604. In this situation, once the main module 200 has been connected to the rear module 300, the modular speaker 100 can be directed, using the swivel fitting 605, in a desired direction so that the sound is propagated in a specific zone of the room in which the modular speaker 100 is mounted, rather than in another zone. The hook-up connectors 600 also comprise connecting terminals 606 extending between the supporting element 603 and the hook-up member 604 and configured to connect the electrical connectors 31 to an electrical power supply.

In use, therefore, depending on where the modular speaker 100 is to be positioned, a rear module 300 provided with suitable hook-up connectors 600 is selected. For example, if the modular speaker 100 is to be hung from the ceiling of a room, a rear module 300 provided with the hanging element 602 will be selected.

After selecting the rear module 300, the second mechanical connector 500*b* can be used to connect the rear module 300 to the second end 21*b* of the cabinet 21 of the speaker 20.

In this situation, the electrical connectors 31 located on the rear module 300 connect the connection circuit 23 located on the second end 21*b* of the cabinet 21 to an electrical power supply, thereby allowing the signal and the power supply to be transferred to the sound transducer 22 of the main module 200 defining the speaker 20. In a possible embodiment, instead of the hook-up connectors 600, the rear module 300 comprises a further connection circuit configured to receive the signal and to transmit the signal to the connection circuit 23 of the main module 200.

Examples of rear modules 300 of this kind are Bluetooth modules and/or modules provided with a battery for powering the speaker 20. More in detail, the electrical connectors 31 are located on the first wall 300*a* of the rear module 300, while the further connection circuit is located on the second wall 300*b*, opposite the first wall 300*a*. In this situation, the rear module 300 also comprises a mechanical connecting means located on the second wall 300*b* and configured to reversibly mount the rear module 300 to a first wall 300*a* of a further rear module 300.

That way, two or more rear modules 300 can be connected in series, as required.

By way of non-limiting example, a rear module 300 provided with Bluetooth can be connected to another rear module 300 provided with hook-up connectors 600 so as to obtain a modular speaker 100 that is connectable to other devices via Bluetooth and that can be mounted on a wall using the hook-up connectors 600. In this situation, the Bluetooth module is interposed between the main module 200 and the further rear module that is provided with the hook-up means 600 so that the electrical connectors 31 are in contact with the conductive tracks 23' of the connection circuit 23 of the cabinet 21, while the further connection circuit is in contact with the electrical connectors 23 of the rear module 300 with the hook-up connectors 600.

The modular speaker 100 made up in this way thus comprises a main module 200 and two rear modules 300 connected to each other in series, one after the other in such a way that the sound transducer 22 receives the power supply and the signal through the electrical connectors 31 and the connection circuits 23 of the rear modules 300. The modular speaker 100 is thus versatile in terms of sound performance and in terms of where it can be positioned. The fact that any front module 400 and any rear module 300 can be reversibly applied to the main module 200 that defines the speaker 20 proper (provided with passive resonators 24, 25 and sound transducer 22) makes it possible, whenever necessary, to modify the acoustic properties of the speaker 20 and/or to replace the hook-up connectors 600 with other hook-up connectors 600, to remove the front module 400 and/or the rear module 300 and to replace them with another selected front module 400 and another selected rear module 300.

Figure 10:
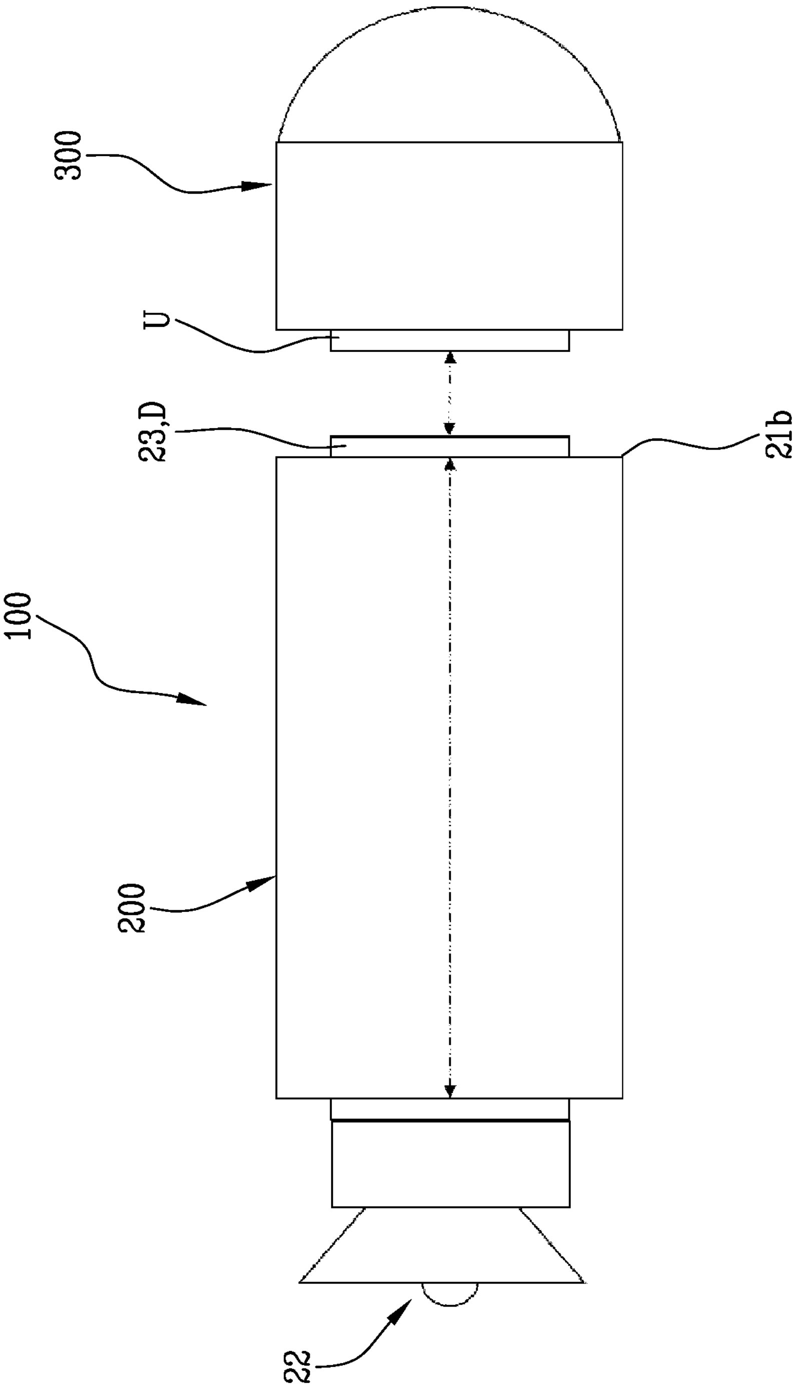
FIG. 10 shows a schematic view of the modular speaker.

As shown in FIG. 10, according to a further aspect of this disclosure, the modular speaker 100 might also comprise an RFID radio frequency identification and communication device D, located at the second end 21*b* of the cabinet 21 and including a memory that is readable and writable by an electronic device outside of the modular speaker 100.

The modular speaker 100 also comprises a control unit U that includes a processor and a memory and that is connected to the RFID radio frequency identification and communication device D and to the connection circuit 23.

In the case of a stand-alone modular speaker 100 (that is, one provided with a main module 200 connected to a rear module 300 and to a front module 400), the control unit U is located in the rear module 300.

Alternatively, in the case of an array of modular speakers 100 applied, for example, to a single panel (FIG. 12B), the control unit U is located on the panel and is operatively connected to each main module 200 of each modular speaker 100.

According to an aspect of the disclosure, the readable and writable memory is configured to record data representing front modules 400 of different kinds, that is to say, representing different accessories that are connectable to the main module 200. The readable and writable memory is also configured to record a unique identification number of each speaker 20, that is, of the main module 200.

The moment a certain front module 400 is applied to the first end 21*a* of the cabinet 21, the control unit U receives from the readable and writable memory through the RFID radio frequency identification and communication device D the unique identification number of the speaker 20 and the data representing the accessory just mounted. In this situation, the control unit U is able to adjust and set the operation of the connection circuit 23 in such a way as to control the sound transducer 22 based on that accessory.

The fact that each time a front module 400 is applied, the control unit U is able to derive from the readable and writable memory the unique identification number of the modular speaker 100 and the data representing the front module 400 just mounted is particularly advantageous because it allows making the most of the sound potential of the modular speaker 100. It is also advantageous when a plurality of speakers 100 are deployed in the form of an array because it allows setting and programming each modular speaker 100 independently of the other modular speakers 100 of the array. In the case of an array of modular speakers 100, as shown, for example, in FIG. 12B, since each modular speaker 200 has its own unique identification number, the control unit U is able to distinguish one modular speaker 100 from another and, for each, to set the operation of the connection circuit 23 based on the front module 400 applied thereto.

Another object of this disclosure is a method for making a modular speaker 100 comprising a step of providing (i.e. preparing) a main module 200 defining a speaker 20 and including a cabinet 21 extending along a longitudinal axis X between a first and a second end 21*a*, 21*b* and having a side wall that extends around the longitudinal axis X to surround an internal volume.

The main module also comprises a sound transducer 22 at the first end 21*a* of the cabinet 21 and a connection circuit 23 located at the second end 21*b* of the cabinet 21 and configured to receive a signal and to transmit the signal to the sound transducer 22.

The method also comprises a step of selecting a rear module 300 from a plurality of rear modules 300 and a step of removably coupling the selected rear module 300 to the second end 21*b* of the cabinet 21. The rear module 300 comprises a plurality of electrical connectors 31 operatively connectable to the connection circuit 23 of the cabinet 21 and to a power source to transmit a signal and an electric power supply to the connection circuit 23, respectively. The method also comprises a step of selecting a front module 400 from a plurality of rear modules 400 and a step of removably coupling the selected front module 400 to the first end 21*a* of the cabinet 21. The front module 400 is an acoustic accessory configured to convey sound waves towards an output of the modular speaker 100 along a predetermined path.

This disclosure also provides a modular sound reproduction system S (FIG. 11) comprising a modular speaker 100 according to one or more of the aspects described in the foregoing.

The system S also comprises a plurality of front modules 400 that are connectable reversibly to the first end 21*a* of the cabinet 21.

In an embodiment, the front modules 400 are connectable to the first end 21*a* of the cabinet 21 by a first mechanical connector 500*a*, for example, a bayonet coupling, a shape coupling or a threaded connector.

Each front module 400 is an acoustic accessory configured to convey sound waves towards an output of the modular speaker 100 along a predetermined path.

Each front module 400 is also configured to modify and/or extend the sound features of the modular speaker 100.

The plurality of front modules 400 may comprise one or more of the following acoustic accessories:

- a protective grid 401 configured to prevent extraneous matter, such as dust, for example, from entering the cabinet 21;
- a speech diffuser 403, 404 selectable from different diffusers having different SPL values;
- a low frequency extension accessory 405 provided with two pairs of passive resonators 24, 25. This accessory substantially replicates the structure of the main module 200 twice;
- a sound deflector 406 configured to spread the sound in a direction different from a direction along which the main module 200 is oriented;
- a 360° sound diffuser 402 configured to spread the sound from the main module 200 in all directions.

In a possible embodiment, the front modules 400 are applicable to the main module 200 interchangeably. In other words, the main module 200 might have only one front module 400 connected to the front end 21*a* of the cabinet 21 at a time. When a front module 400 mounted on the main module 200 needs to be replaced, it is removed and another front module 400 is mounted in its place.

Alternatively, the front modules 400 may be applied to the first end 21*a* of the cabinet 21 in series. For example, both the protective grid 401 and the speech diffuser 403, 404 might be applied.

Figure 11:
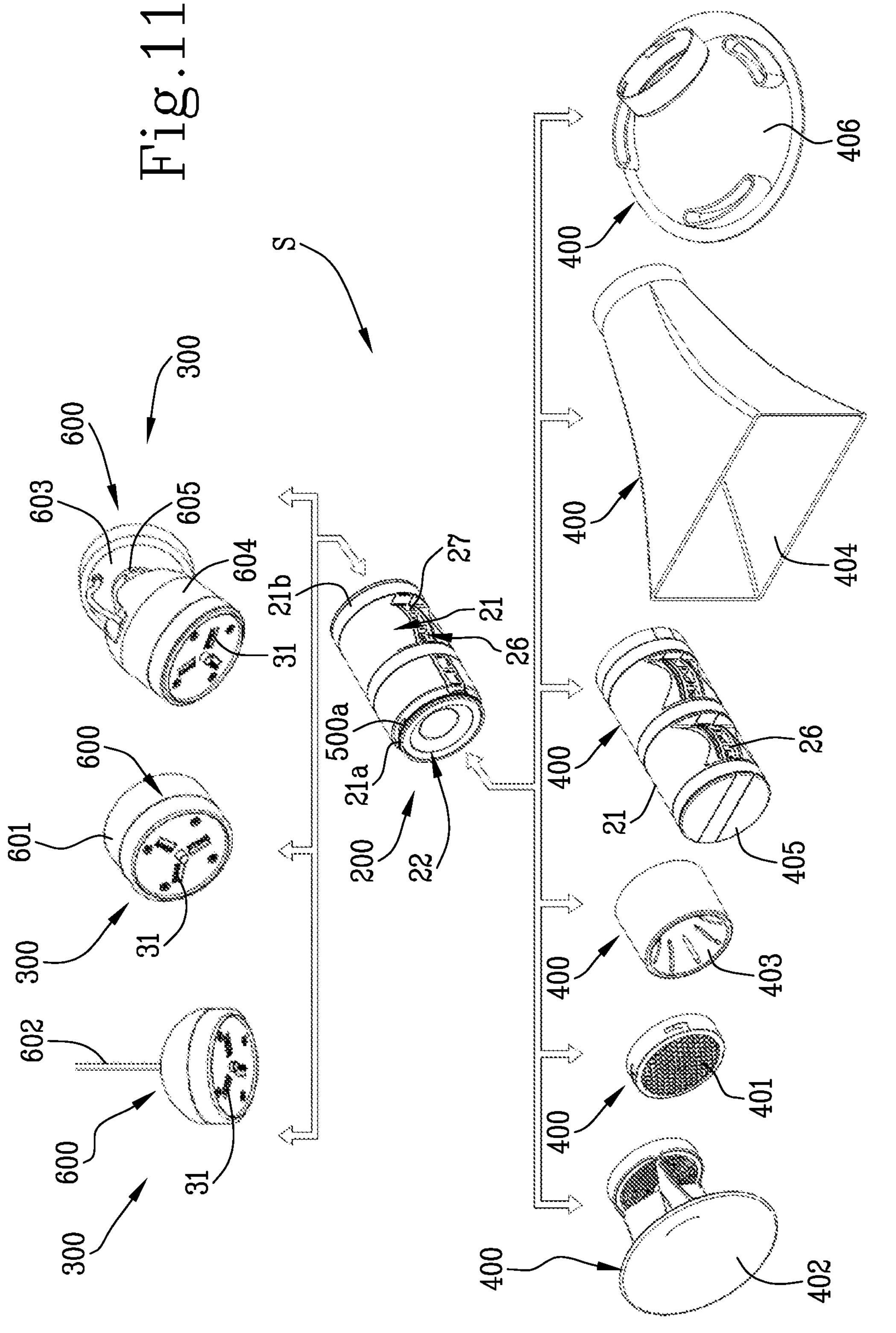
FIG. 11 shows a modular sound system.

According to an aspect of this disclosure, the system S also comprises a plurality of rear modules 300 that are operatively connectable reversibly to the second end 21*b* of the cabinet 21 (FIG. 11).

In an embodiment of the invention, the rear modules 300 are connectable to the second end 21*b* of the cabinet 21 of the main module 200 by a second mechanical connector 500*b*, for example, a bayonet coupling, a shape coupling or a threaded connector.

In a possible embodiment, the rear modules 300 are connectable to the main module 200 interchangeably.

Alternatively, the rear modules 300 can be combined with each other in series.

Each rear module 300 comprises a plurality of electrical connectors 31 operatively connectable to the connection circuit 23 of the cabinet 21 and to a power source to transmit a signal and an electric power supply to the connection circuit 23, respectively. Preferably, the electrical connectors 31 are located on a first wall 300*a* of the rear module 300. In a possible embodiment, each rear module 300 also comprises hook-up connectors 600 configured to mount the main module 200 on a wall. Preferably, the hook-up connectors 600 are located on a second wall 300*b*, opposite the first wall 300*a*.

By way of non-limiting example, the hook-up connectors 600 may comprise a plate 601 configured to enable the main module 200 to be mounted permanently on a wall. Alternatively, the hook-up connectors 600 may comprise a hanging element 602, for example, a string or a cable, configured for hanging the main module 200 from a ceiling. Alternatively, the hook-up connectors 600 comprise a supporting element 603, fixable to a wall to apply the main module 200 to the wall permanently, and a hook-up member 604 operatively connected to the supporting element 603 by a swivel fitting 605. The swivel fitting 605 is configured to allow adjusting the orientation of the hook-up member 604 so that the orientation of the main module 200 can also be adjusted.

Alternatively to the hook-up connectors 600, some of the rear modules 300 of the plurality of rear modules 300 may comprise, on their second wall 300*b*, a further connection circuit configured to receive the signal and to transmit the signal to the connection circuit 23 of the main module 200. These rear modules 300 each also comprise a mechanical connecting means located on the second wall 300*b* and configured to reversibly mount the rear module 300 to the first wall 300*a* of a further rear module 300. In this situation, the rear modules 300 can be connected to each other to obtain a series of rear modules 300 that could terminate with a rear module 300 provided with hook-up connectors 600.

Figure 12A:
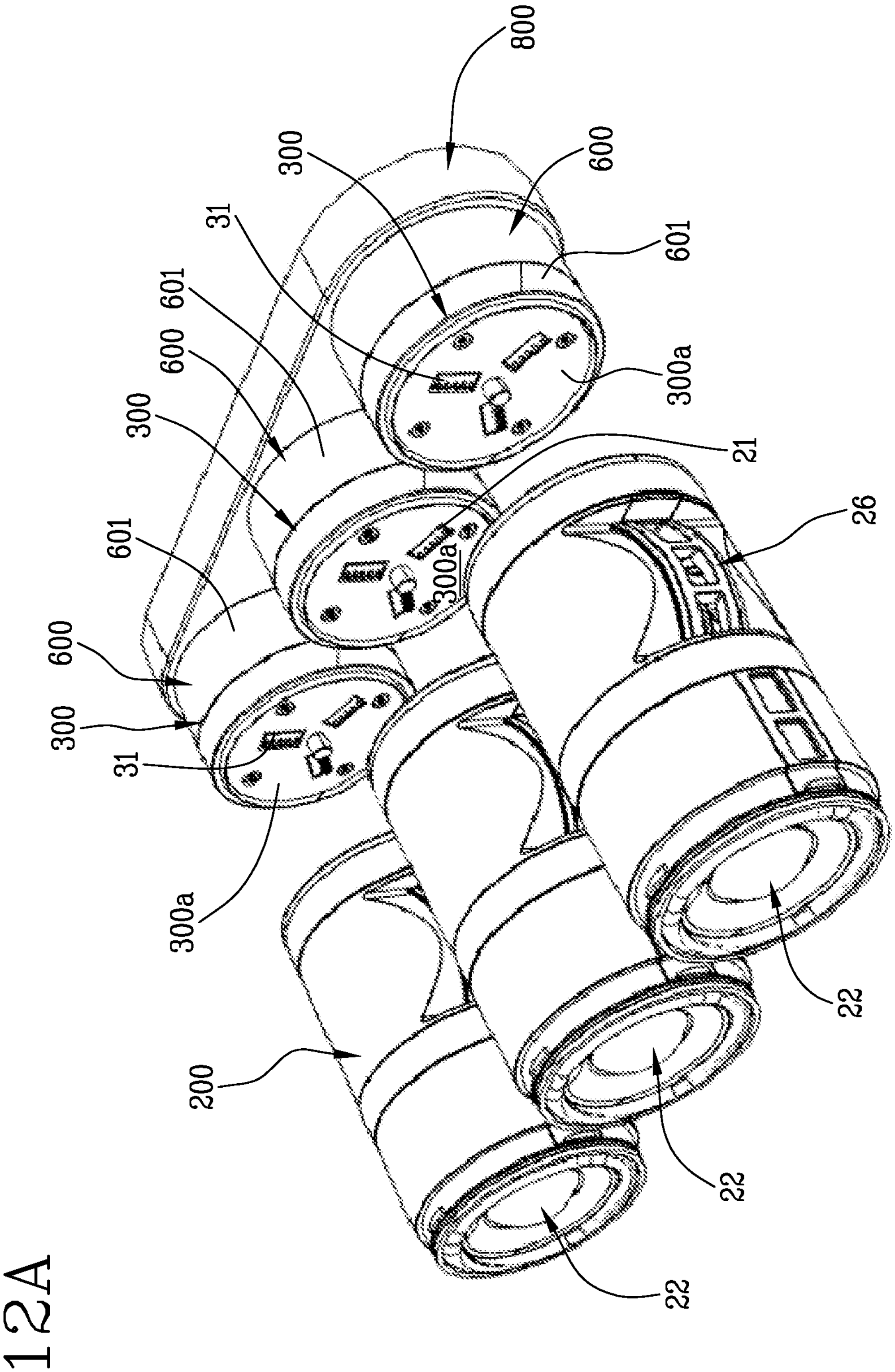
FIGS. 12A-12C show cross-sectional views of further embodiments of the modular sound system.
Figure 12B:
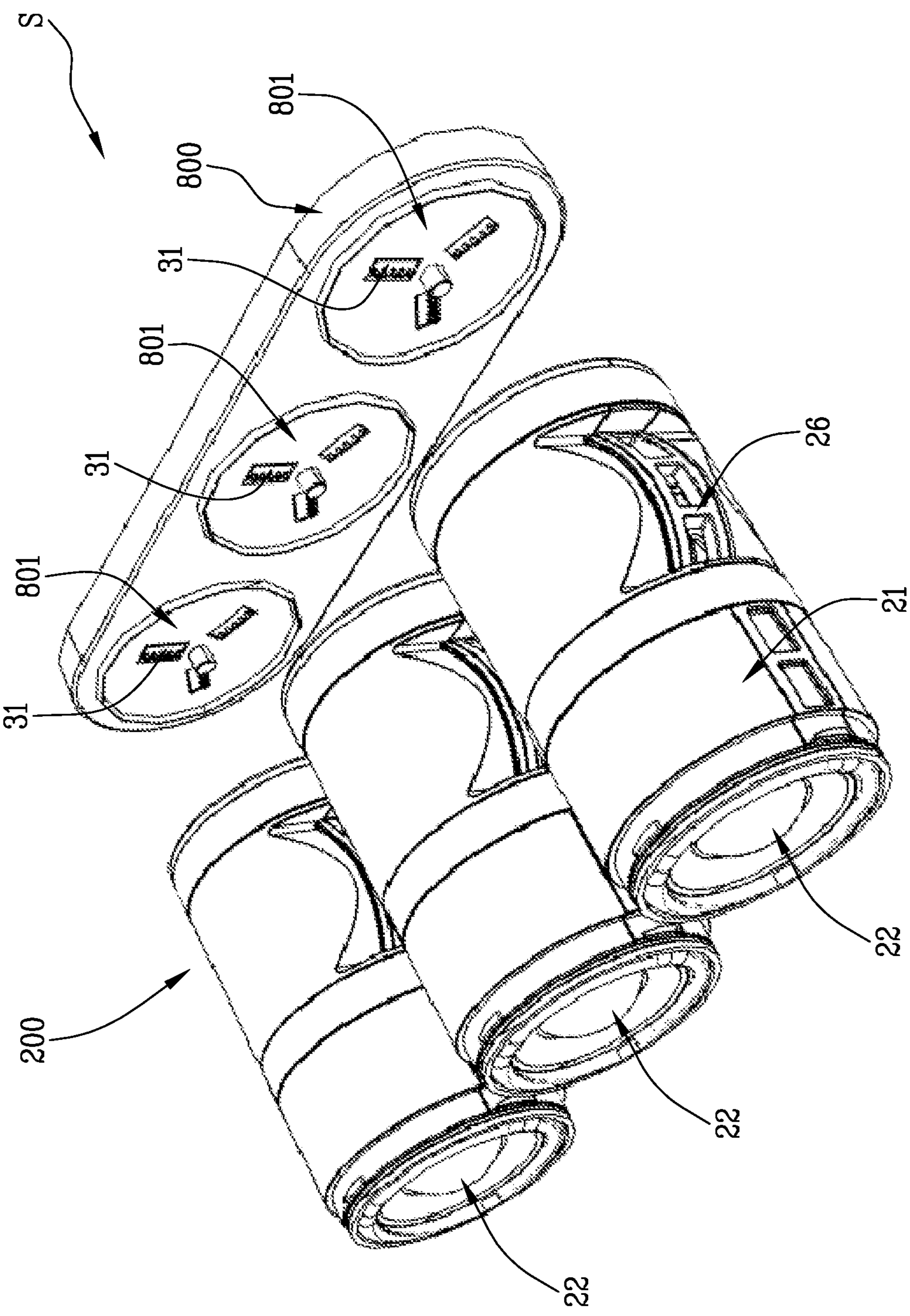
Figure 12C:
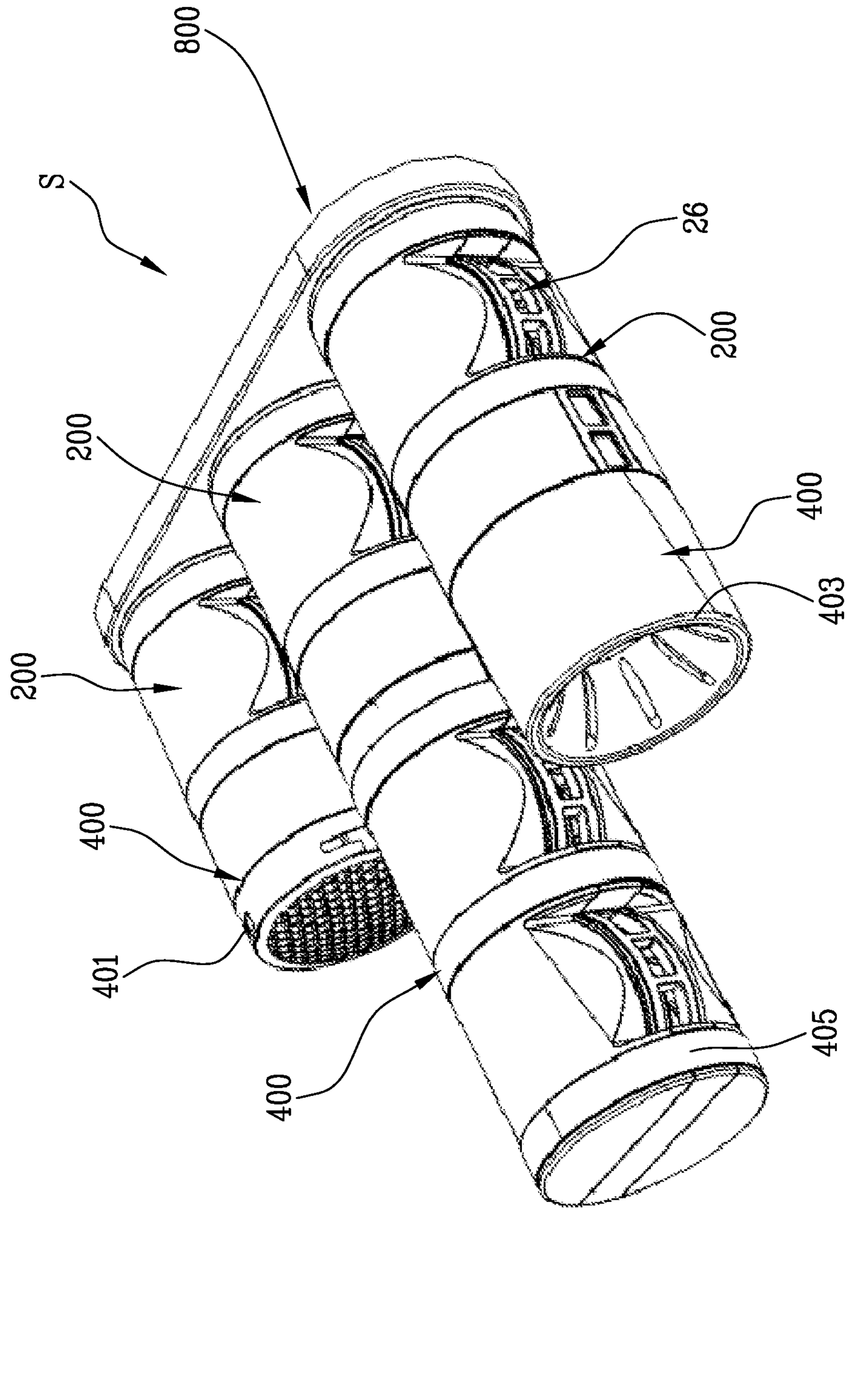

In a possible embodiment, as shown in FIGS. 12A, 12B, 12C, the system S comprises a supporting structure 800 configured to allow two or more main modules 200 defining respective speakers 20 to applied simultaneously on a wall or ceiling.

The supporting structure 800 is provided with a succession of housings 801, each configured to accommodate a rear module 300 that is mountable to a respective main module 200. In the example shown in FIG. 12A, the main modules 200 are connected to the supporting structure 800 by respective plate-like hook-up connectors 601. Alternatively, the main modules 200 might be connected to the supporting structure 800 by rear modules 300 whose hook-up connectors 600 comprise the supporting element 603 and the hook-up member 604.

In a possible embodiment, the rear modules 300 mounted to the supporting structure 800 have the same hook-up means 600.

Alternatively, the rear modules 300 mounted to the supporting structure 800 have different hook-up connectors 600.

According to a further aspect of this disclosure, the supporting structure 800 might have a plurality of electrical connectors 31 in each housing 801 (FIG. 12B). In this situation, the main modules 200 of the modular speakers 100 are each plugged directly into a respective housing 801 by the second end 21*b* of the cabinet 21 without interposing any rear module 300.

In this situation, there is a single control unit U capable of managing and modulating the operation of each modular speaker 100 based on the front module 400 mounted thereon.

As mentioned above, since each modular speaker 200 has its own unique identification number, the control unit U is able to distinguish one modular speaker 100 from another and, for each, to set the operation of the connection circuit 23 based on the front module 400 applied thereto (FIG. 12C).

This disclosure also provides a speaker 20.

Generally speaking, the speaker 20 may be separate from and independent of the modular speaker 100 described above.

Figure 5B:
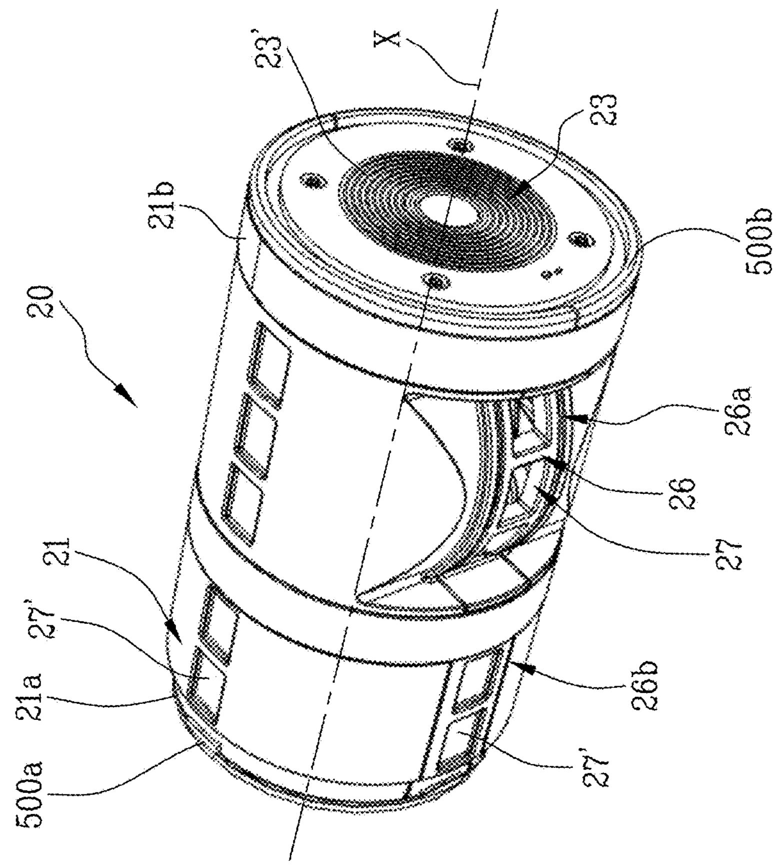
FIGS. 5A and 5B are perspective views of a speaker.
Figure 5A:
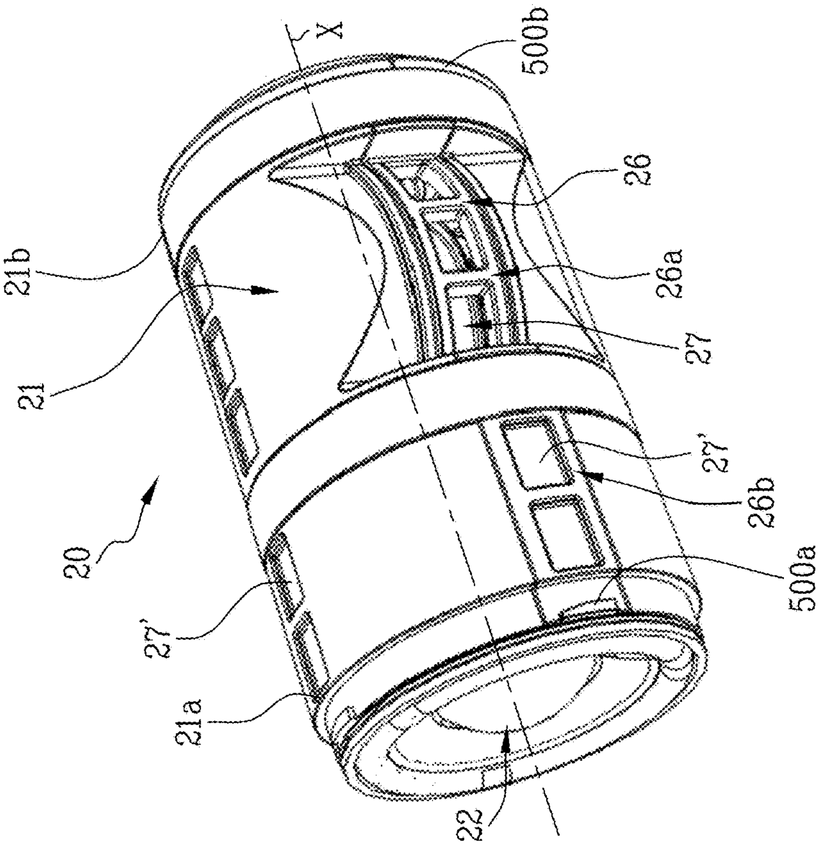

Alternatively, in a possible embodiment, the speaker 20 may be used as the main module 200 of the modular speaker 100 described above. With reference to FIGS. 5A, 5B, the speaker 20 comprises a cabinet 21 extending along a longitudinal axis X between a first and a second end 21*a*, 21*b*.

The cabinet 21 includes a side wall extending around the longitudinal axis X to surround an internal volume. This side wall is provided with an opening to place the internal volume in communication with an outside environment.

As shown in the embodiment of the accompanying drawings, the side wall of the cabinet 21 is cylindrical or substantially cylindrical in shape. According to an aspect of this disclosure, the side wall is defined by two (identical) half-shells which are reversibly mountable to a supporting frame 26.

The supporting frame 26 extends along the longitudinal axis X and is substantially planar in shape so that the two half-shells can be reversibly attached to opposite faces of the supporting frame 26. In this situation, the side wall that delimits the internal volume is made partly by the supporting frame 26 and partly by the half-shells attached to the supporting frame.

As shown in FIGS. 5A and 5B, a central strip of the side wall is delimited by the supporting frame 26 which has, attached to it, the two half-shells which delimit the internal volume together with the supporting frame 26 itself.

In a possible embodiment, the half-shells are made of hard plastic whilst the supporting frame 26 is made of metallic material. As shown in FIGS. 5A and 7, the speaker 20 also comprises a sound transducer 22, provided at the first end 21*a* of the cabinet 21.

More in detail, the sound transducer 22 is mechanically connected to the first end 21*a* of the cabinet 21 by a head end portion 26*b* of the supporting frame 26 which defines a housing to accommodate the sound transducer 22 itself. As shown in FIG. 9, the head end portion 26*b* is shaped to define two grip elements 26*b*', 26*b*" extending parallel to the longitudinal axis X and disposed symmetrically about the longitudinal axis X. The grip elements 26*b*', 26*b*" engage the sound transducer 22 in such a way as to hold it in position near the first end 21*a* of the cabinet 21 of the speaker 20 (FIGS. 7 and 8).

In an example embodiment, the sound transducer 22 may comprise a vibrating panel.

Alternatively, the sound transducer 22 might include a piezoelectric material or other systems of essentially known type in the field of sound reproduction systems. The sound transducer 22 also includes an electric motor configured to set the membrane vibrating.

As shown in FIGS. 7 and 8, the speaker 20 also comprises a first and a second passive resonator 24, 25, each comprising a panel 24*a*, 25*a*.

The vibrating panels 24*a*, 25*a* are each positioned in the internal volume, with respective first faces facing each other and respective second faces opposite the first faces (FIG. 6).

Advantageously, the fact that the first and the second passive resonator 24, 25 are positioned entirely inside the cabinet 21 of the speaker 20 means that the resonators are protected against external agents, such as dust, for example, and against shocks, thus making the speaker 20 as a whole more resistant and reliable.

As shown in FIG. 6, the second faces of the vibrating panels 24*a*, 25*a* and an inside surface of the cabinet 21 (specifically, the inside surface of the side wall of the cabinet) delimit a first, closed (or substantially closed) air volume V1 inside the internal volume. The first volume V1 is also called volume of loading of the passive resonator. On the other hand, the first faces of the vibrating panels 24*a*, 25*a* delimit, inside the internal volume, a second air volume V2 that is open towards the outside environment through the opening. In this situation, while the sound transducer 22 is actively driven by the motor, the passive resonators 24, 25 are driven by the air pressure change in the first volume V1 to allow extending the frequency response of the speaker 20 to low frequencies.

Thus, the passive resonators 24, 25 are configured to vibrate in response to a change in the air pressure of the internal volume so as to produce the sound. More specifically, the vibrating panels 24*a*, 25*a* of the passive resonators 24, 25 are displaced between a position where they are spaced apart and a position where they are close together. At the position where they are spaced apart, the vibrating panels 24*a*, 25*a* are moved in such a way that the second faces are brought near the lateral inside surface of the cabinet 21. In this situation, the second air volume V2 is larger than when it is delimited by the vibrating panels 24*a*, 25*a* at rest. At the position where they are close together, on the other hand, the vibrating panels 24*a*, 25*a* are moved in such a way that the first faces are brought closer together. In this situation, the second air volume V2 is smaller than when it is delimited by the vibrating panels 24*a*, 25*a* at rest and the air contained therein is pushed outside the cabinet 21 through the opening.

In other words, thanks to the movement of the vibrating panels 24*a*, 25*a* of the passive resonators 24, 25, the internal volume of the speaker 20, comprising both the first and second volumes V1, V2, undergoes changes in pressure that produce the sound.

According to an aspect of this disclosure, the first and the second passive resonator 24, 25 are positioned inside the internal volume symmetrically about the longitudinal axis X.

According to a further aspect of this disclosure, the first and the second passive resonator 24, 25 are circular or substantially circular in shape. Alternatively, the first and the second passive resonator 24, 25 are substantially oblong or elliptical in shape.

Advantageously, these shapes allow maximizing the surface area of the passive resonators 24, 25, thus increasing the value of SPL (sound pressure level) of the speaker 20 without increasing the overall size of the speaker 20.

Advantageously, these shapes, combined with the fact that the passive resonators 24, 25 are located entirely inside the internal volume allows obtaining a speaker 20 of reduced weight and size and providing good sound quality.

As shown in FIG. 7, the first and the second passive resonator 24, 25 are mounted on the supporting frame 26 in such a way as to be mutually spaced apart by a minimum distance such as not to touch each other when vibrating in counterphase.

In other words, since the vibrating panels 24*a*, 25*a* move towards and away from each other when they vibrate, the passive resonators 24, 25 are positioned on the supporting frame 26 in such a way that they do not touch each other when they are close together, thereby allowing the sound to be emitted from the speaker 20.

The fact that the passive resonators 24, 25 are positioned at a minimum distance from each other is advantageous because it means the speaker 20 can be reduced in size, making it lighter and more manageable. This arrangement of the passive resonators 24, 25 allows optimizing the dimensions of the internal volume to obtain a speaker 20 that is compact in size but, at the same time, ranks high in performance in terms of SPL. More specifically, this arrangement allows maximizing the second volume V2 without thereby increasing the overall size of the speaker 20. In effect, the second volume V2 is maximized because, although the passive resonators 24, 25 are at a minimum distance from each other, the circular or oblong shape of the passive resonators 24, 25 allows maximizing their surface, thus increasing the size of the second volume V2.

To support the first and the second passive resonator 24, 25, the supporting frame 26 comprises an annular portion 26*a*, to opposite faces of which the first and the second passive resonator 24, 25 are applied.

In the embodiment of FIG. 9, the annular portion 26*a* of the supporting frame 26 has a first, circular edge 26*a*' defining a first face of the supporting frame 26 and a second, circular edge 26*a*", opposite the first circular edge 26*a*' relative to the longitudinal axis X, defining the second face of the supporting frame 26.

According to an aspect of this disclosure, as shown clearly in FIGS. 7 and 8, the first and the second passive resonator 24, 25 are applied to the first and the second circular edge 26*a*', 26*a*" of the annular portion 26*a* so that the respective vibrating panels 24*a*, 25*a* form folds (or creases) that are radially directed. These folds are configured to allow each vibrating panel 24*a*, 25*a* to be displaced when subjected to the action of the air passing through the opening.

The annular portion 26*a* also has a lateral surface (or side wall) extending between the first and the second circular edge 26*a*', 26*a*" (that is, between the first and the second passive resonator 24, 25) and provided with a plurality of angularly distributed slots 27 (or openings) defining the opening of the side wall of the cabinet 21. In other words, the lateral surface of the annular portion 26*a* defines a sort of grid provided with slots 27 configured to allow air to pass to and from the second volume V2 to allow the speaker 20 to produce the sound.

Preferably, the slots 27 are substantially rectangular in cross section. In an embodiment, the pattern defined by the slots 27 of the annular portion 26*a* is reproduced on the surface of the grip elements 26*b*', 26*b*" of the supporting frame 26 facing the outside of the internal volume (that is, on the surface that is visible even when the half-shells are attached to the supporting frame 26). That way, there is visual continuity between the annular portion 26*a* of the supporting frame 26, where the slots 27 put the outside environment in fluid communication with the second volume V2 and the head end portion 26*b* of the supporting frame 26, where the slots 27' are blind and have a purely aesthetic function. Furthermore, the pattern defined by the slots 27 may be reproduced on each half-shell. In this case, too, the slots 27' are blind and made during the process of production of the half-shells so as to make the speaker 20 aesthetically harmonious and pleasing to the eye.

According to an aspect of this disclosure, the supporting frame 26 also comprises a tail end portion 26*c*, in addition to the head end portion 26*b* and the annular portion 26*a*.

The tail end portion 26*c* is located in the proximity of the second end 21*b* of the cabinet 21.

The tail end portion 26*c*, the head end portion 26*b* and the annular portion 26*c* are axially aligned along the longitudinal axis X. In this situation, the annular portion 26*a* is interposed between the tail end portion 26*c* and the head end portion 26*b* (FIG. 9). The tail end portion 26*c* and the head end portion 26*b* are thus diametrically opposite each other relative to the annular portion 26*a* and substantially tangent thereto.

According to an aspect of this disclosure, as shown in FIG. 5A, the side wall of the cabinet 21 is provided with recesses in proximity to the annular portion 26*a* of the supporting frame 26. This shape is advantageous in that it allows different speakers 20 to be placed near each other without the risk of the slots 27 of one speaker 20 being obstructed by portions of the speaker 20 near it.

This shape is also advantageous because, if the speaker 20 is covered by a protective covering, such as, for example, a cloth net for speakers, such a covering does not come into direct contact with the annular portion 26*a* and thus allows air to flow out of the second volume V2 correctly through the slots 27.

According to a further aspect of this disclosure, the speaker 20 also comprises a connection circuit 23 provided at the second end 21*b* of the cabinet 21 (FIG. 5B).

The connection circuit 23 is configured to receive a signal and to transmit the signal to the sound transducer 22.

In accordance with the embodiment shown in the accompanying drawings, the annular portion 26*a* of the supporting frame 26 has a diameter that is substantially equal to an axial distance, measured along the longitudinal axis X, between the sound transducer 22 and the connection circuit 23. This aspect is particularly advantageous in that it contributes to reducing the overall size of the speaker 20 and makes it easier to electrically connect the connection circuit 23 to the sound transducer 22.

In a possible embodiment, the connection circuit 23 comprises a plurality of concentric conductive tracks 23' having a planar shape. These conductive tracks 23' are centred on the longitudinal axis X, as shown in FIG. 5B.

In a possible embodiment, the plurality of conductive tracks 23' comprises a pair of power supply tracks performing the function of positive terminal and negative terminal, respectively, to make an electrical connection between the connection circuit 23 and a power source. In a possible embodiment, the pair of power supply tracks also carries the signal to the sound transducer 22. Alternatively, the signal is carried by another pair of conductive tracks 23' of the plurality. In a further possible embodiment, the plurality of conductive tracks 23' also comprises a pair of lighting tracks configured to transmit an electrical power supply signal to a light source, for example, a LED light source. The light source is visible to an observer looking at the first end 21*a* of the cabinet 21 from the outside and is electrically connected to the connection circuit 23 to receive an electric power supply signal.

In effect, the light source is located in the sound transducer 22 and is configured to emit a light signal during operation of the speaker 20. More in detail, the light source has a diagnostic function where a certain colour is associated with the operating state of the speaker 20, for example, a standby state or an operational state.

A plurality of electrical connectors 31, for example, deformable connectors, are provided to connect the connection circuit 23 to a power source.

These electrical connectors 31 are configured to transmit the signal and an electrical power supply to the connection circuit 23.

In a possible embodiment, at the second end 21*b*, the speaker 20 comprises a built-in plate on which the electrical connectors 31 are positioned in such a way as to connect each conductive track 23' of the connection circuit 23 to the power supply.

Since the conductive tracks 23' extend around the longitudinal axis X, the electrical connectors 31 make contact whatever the angular position of the speaker 20 relative to the plate, thus allowing the speaker 20 to be powered.

In the embodiment shown in the accompanying drawings, the electrical connectors 31 are disposed radially around the longitudinal axis X so they can reach each conductive track 23' of the connection circuit 23.

This arrangement of the electrical connectors 31 is particularly advantageous, even in the case where the speaker

20 needs to be hung from, or fixed to, a wall, because it allows a hook-up element to be positioned so it is centred on the longitudinal axis X without cutting off/hindering the electrical connection.

In a possible embodiment, the speaker 20 may be made in such a way that the hook-up element—an eye bolt, for example—is integrated in the tail end portion 26*c* of the supporting frame 26.

Alternatively, the hook-up element, like the electrical connectors 31, might be made on a rear module 300 that is removably connectable (hence replaceable) to the second end 21*b* of the cabinet 21 of the speaker 20. In this situation, the speaker 20 defines a main module 200 of a modular speaker 100 to which the rear module 300 provided with the electrical connectors 31 and the hook-up element can be connected.

The speaker 20 comprises a second mechanical connector 500*b*, for example, a threaded connector, a shape coupling or a bayonet coupling, configured to mechanically connect the second end 21*b* of the cabinet 21 reversibly to a rear module 300 that is at least adapted to connect the cabinet 21 to a wall.

As mentioned above, the rear module 300 might therefore be provided with electrical connectors 31 as well as with a hook-up element so that once connected to the second end of the cabinet 21, the rear module 300 can provide the speaker 20 with an electrical power supply. In this situation, the rear module 300 acts not only as an electrical connection to plug the speaker 20 to a power supply but also as a support for mounting the speaker 20 to a wall.

According to an aspect of this disclosure, as shown for example in FIG. 5A, the speaker 20 also comprises a first mechanical connector 500*a*, for example, a threaded connector, a shape coupling or a bayonet coupling, configured to mechanically connect the first end 21*a* of the cabinet 21 reversibly to a front module 400 defining an acoustic accessory adapted to convey sound waves towards an output of the speaker 20 along a predetermined path.

According to an aspect of this disclosure, the speaker 20 might also comprise an RFID radio frequency identification and communication device D, located at the second end 21*b* of the cabinet 21 and including a memory that is readable and writable by an electronic device outside of the speaker 20. The speaker 20 also comprises a control unit U that includes a processor and a memory and that is connected to the RFID radio frequency identification and communication device and to the connection circuit.

In the case of a stand-alone speaker 20, the control unit U is located in the rear module 300. Alternatively, in the case of an array of speakers 20 applied, for example, to a single panel, the control unit U is located on the panel and is operatively connected to each speaker 20.

According to an aspect of the disclosure, the readable and writable memory is configured to record data representing front modules 400 of different kinds, that is to say, representing different accessories. The readable and writable memory is also configured to record a unique identification number of the speaker 20. The moment a certain front module 400 is applied to the first end 21*a* of the cabinet 21, the control unit U receives from the readable and writable memory through the RFID radio frequency identification and communication device D the unique identification number of the speaker 20 and the data representing the accessory just mounted. In this situation, the control unit U is able to adjust and set the operation of the connection circuit 23 in such a way as to control the sound transducer 22 based on that accessory.

The fact that each time a front module 400 is applied, the control unit U is able to derive from the readable and writable memory the unique identification number of the speaker 20 and the data representing the front module 400 just mounted is particularly advantageous when two or more speakers 20 are mounted in array format in that it allows setting and programming each speaker 20 independently of the other speakers 20 and varying its sound features.

Also an object of this disclosure is a method for sound reproduction comprising a step of providing (i.e. preparing) a cabinet 21 extending along a longitudinal axis X between a first and a second end 21*a*, 21*b*.

The cabinet 21 includes a side wall extending around the longitudinal axis X to surround an internal volume and is provided with an opening to place the internal volume in communication with an outside environment. The method also comprises a step of providing (i.e. preparing) a sound transducer 22, provided at the first end 21*a* of the cabinet 21. The method also comprises a step of receiving a signal in a connection circuit 23 located at the second end 21*b* of the cabinet 21 and a step of transmitting the signal from the connection circuit 23 to the sound transducer 22.

The method also comprises a step of providing (i.e. preparing) a first and a second passive resonator 24, 25, each comprising a vibrating panel 24*a*, 25*a*. The vibrating panels 24*a*, 25*a* are positioned in the internal volume, with respective first faces facing each other and respective second faces opposite the first faces. The internal volume includes a first, closed air volume V1, delimited by an inside surface of the cabinet 21 and by the second faces of the vibrating panels 24*a*, 25*a* to create a volume of loading of the first and second passive resonators 24, 25 and a second air volume V2, delimited by the first faces of the vibrating panels 24*a*, 25*a* and open towards the outside environment so that a rise in the pressure of the first volume V1 causes the vibrating panels 24*a*, 25*a* to move closer together.

The method includes a step of driving the sound transducer by a motor, whereby the passive resonators are driven by an air pressure change in the first volume.

This invention achieves the preset aims and overcomes the disadvantages of the prior art.

This invention provides a speaker which has a high SPL value but which is compact in size.

This invention provides a modular speaker that is versatile not only in terms of its sound features but also in terms of where it can be positioned.

This invention provides a modular system which, with a single main module, allows obtaining numerous combinations which can be positioned in different ways and which offer a wide range of sound features.

The invention claimed is:

1. A modular speaker, comprising:

a main module defining a speaker and including:

a cabinet, extending along a longitudinal axis between a first and a second end and having a side wall that extends around the longitudinal axis to surround an internal volume;

a sound transducer, provided at the first end of the cabinet;

a connection circuit, positioned at the second end of the cabinet and configured to receive a signal and to transmit the signal to the sound transducer;

a rear module, selectable from a plurality of rear modules and connectable removably to the second end of the cabinet, the rear module comprising a plurality of electrical connectors operatively connectable to the connection circuit of the cabinet and to a power source to transmit a signal and an electric power supply to the connection circuit, respectively;

a plurality of acoustic accessories of different typologies, each acoustic accessory of the plurality of acoustic accessories being connectable removably to the first end of the cabinet to convey sound waves towards an output of the modular speaker along a predetermined path, wherein the predetermined path varies according to the typology of acoustic accessory;

a front module, selected from the plurality of acoustic accessories, connected removably to the first end of the cabinet;

wherein the main module comprises:

a first mechanical connector configured to establish a reversible mechanical connection between the first end of the cabinet and the front module, the first mechanical connector including any of the following: a shape coupling, a bayonet coupling, or a threaded coupler; and a second mechanical connector configured to establish a reversible mechanical connection between the second end of the cabinet and the rear module, the second mechanical connector including any of the following: a shape coupling, a bayonet coupling or a threaded connector.

2. The modular speaker according to claim 1, wherein the rear module comprises a hook-up connector configured to connect the modular speaker to a wall.

3. The modular speaker according to claim 2, wherein the hook-up connector includes a plate applicable to a wall and connecting terminals configured to connect the electrical connectors to an electrical power supply.

4. The speaker according to claim 2, wherein the hook-up connectors comprise a hanging element extending away from the rear module and configured for hanging the modular speaker from a ceiling.

5. The modular speaker according to claim 4, wherein the hanging element comprises an outer sheath defining a housing for connecting terminals that are configured to connect the electrical connectors to an electrical power supply.

6. The modular speaker according to claim 2, wherein the hook-up connector comprises:

a supporting element fixable to a wall to apply the modular speaker to the wall permanently;

a hook-up member operatively connected to the supporting element by a swivel fitting, the swivel fitting being configured to allow adjusting the orientation of the hook-up member;

connecting terminals extending between the supporting element and the hook-up member and configured to connect the electrical connectors to an electrical power supply.

7. The modular speaker according to claim 1, wherein the electrical connectors are located on a first wall of the rear module and wherein the rear module comprises, on a second wall, opposite the first wall, a further connection circuit configured to receive the signal and to transmit the signal to the connection circuit, the rear module further comprising a mechanical connection means, located on the second wall, and configured to reversibly mount the rear module to a first wall of a further rear module.

8. The modular speaker according to claim 1, wherein the connection circuit comprises a plurality of concentric conductive tracks having a planar shape, the conductive tracks being centred relative to the longitudinal axis.

9. The modular speaker according to claim 1, wherein the front module is selectable from one of the following:

a protective grid configured to prevent extraneous matter from entering the cabinet;

a speech diffuser;

a low frequency extension accessory provided with two pairs of passive resonators;

a sound deflector configured to spread a sound in a direction different from a direction defined by the longitudinal axis;

a 360° sound diffuser configured to spread the sound in all directions.

10. The modular speaker according to claim 1, wherein the side wall of the cabinet is provided with an opening to place the internal volume in communication with an outside environment, and wherein the speaker comprises a first and a second passive resonator, each including a vibrating panel, the vibrating panels being positioned in the internal volume with respective first faces facing each other and respective second faces opposite the first faces and wherein the internal volume includes a first, closed air volume, delimited by an inside surface of the cabinet and by the second faces of the vibrating panels, and a second air volume, delimited by the first faces of the vibrating panels and open towards the outside environment through the opening.

11. The modular speaker according claim 1, wherein:

the rear module has a front end that is operatively connected to the main module, the front module has a rear end that is operatively connected to the main module, the main module, the front end of the rear module and the rear end of the front module are substantially cylindrical in shape and are aligned along the longitudinal axis.

12. The modular speaker according claim 1, wherein side wall of the cabinet is provided with an opening to place the internal volume in communication with an outside environment, the main module further including a first and a second passive resonator, each comprising a vibrating panel, the vibrating panels being positioned in the internal volume, with respective first faces facing each other and respective second faces opposite the first faces, wherein the internal volume includes a first, closed air volume, delimited by an inside surface of the cabinet and by the second faces of the vibrating panels, and a second air volume, delimited by the first faces of the vibrating panels and open towards the outside environment through the opening.

13. The modular speaker according to claim 12, wherein the sound transducer is acoustically connected to the first air volume.

14. The modular speaker according to claim 12, wherein the cabinet comprises a supporting frame, and wherein first passive resonator and the second passive resonator are accommodated in the supporting frame and the sound transducer is connected to the supporting frame.

15. The modular speaker according to claim 14, wherein the supporting frame includes:

a head end portion, located at the first end and defining a housing to accommodate the sound transducer;

a tail end portion, located at the second end;

an annular portion, surrounding the first and the second passive resonator to accommodate them, the annular portion being interposed between the head end portion and the tail end portion.

16. The modular speaker according to claim 12, wherein the vibrating panels of the first and a second passive resonator are configured to vibrate along a transversal axis, the transversal axis being perpendicular to the longitudinal axis.

17. A modular speaker, comprising:

a main module defining a speaker and including:

a cabinet, extending along a longitudinal axis between a first and a second end and having a side wall that extends around the longitudinal axis to surround an internal volume;

a sound transducer, provided at the first end of the cabinet;

a connection circuit, positioned at the second end of the cabinet and configured to receive a signal and to transmit the signal to the sound transducer;

a rear module, selectable from a plurality of rear modules and connectable removably to the second end of the cabinet, the rear module comprising a plurality of electrical connectors operatively connectable to the connection circuit of the cabinet and to a power source to transmit a signal and an electric power supply to the connection circuit, respectively;

a front module, defining an acoustic accessory selectable from a plurality of front modules, the front module being connectable removably to the first end of the cabinet and being configured to convey sound waves towards an output of the modular speaker along a predetermined path, wherein the main module comprises:

a first mechanical connector configured to establish a reversible mechanical connection between the first end of the cabinet and the front module;

a second mechanical connector configured to establish a reversible mechanical connection between the second end of the cabinet and the rear module, the first and the second mechanical connector including any of the following: a shape coupling, a bayonet coupling or a threaded connector.

18. A modular speaker, comprising:

a main module defining a speaker and including:

a cabinet, extending along a longitudinal axis between a first and a second end and having a side wall that extends around the longitudinal axis to surround an internal volume;

a sound transducer, provided at the first end of the cabinet;

a connection circuit, positioned at the second end of the cabinet and configured to receive a signal and to transmit the signal to the sound transducer;

a rear module, selectable from a plurality of rear modules and connectable removably to the second end of the cabinet, the rear module comprising a plurality of electrical connectors operatively connectable to the connection circuit of the cabinet and to a power source to transmit a signal and an electric power supply to the connection circuit, respectively;

a front module, defining an acoustic accessory selectable from a plurality of front modules, the front module being connectable removably to the first end of the cabinet and being configured to convey sound waves towards an output of the modular speaker along a predetermined path, wherein the electrical connectors are located on a first wall of the rear module and wherein the rear module comprises, on a second wall, opposite the first wall, a further connection circuit configured to receive the signal and to transmit the signal to the connection circuit, the rear module further comprising a mechanical connection means, located on the second wall, and configured to reversibly mount the rear module to a first wall of a further rear module.

* * * * *